(12) United States Patent
Yu et al.

(10) Patent No.: US 12,206,259 B2
(45) Date of Patent: Jan. 21, 2025

(54) ELECTRONIC DEVICE WIRELESSLY TRANSMITTING POWER, WIRELESS POWER RECEPTION DEVICE WIRELESSLY RECEIVING POWER, AND METHOD FOR OPERATING THE SAME

(71) Applicant: Samsung Electronics Co., Ltd., Gyeonggi-do (KR)

(72) Inventors: Taehyeon Yu, Gyeonggi-do (KR); Kihyun Kim, Gyeonggi-do (KR); Dongzo Kim, Gyeonggi-do (KR); Jihye Kim, Gyeonggi-do (KR); Yunjeong Noh, Gyeonggi-do (KR); Keyic Son, Gyeonggi-do (KR); Kyungmin Lee, Gyeonggi-do (KR); Hyungkoo Chung, Gyeonggi-do (KR); Mincheol Ha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 115 days.

(21) Appl. No.: 17/578,007

(22) Filed: Jan. 18, 2022

(65) Prior Publication Data
US 2022/0231544 A1 Jul. 21, 2022

Related U.S. Application Data

(63) Continuation of application No. PCT/KR2022/000309, filed on Jan. 7, 2022.

(30) Foreign Application Priority Data

Jan. 18, 2021 (KR) .................. 10-2021-0007086

(51) Int. Cl.
*H02J 50/80* (2016.01)
*H02J 50/12* (2016.01)
*H02J 50/90* (2016.01)

(52) U.S. Cl.
CPC .............. *H02J 50/80* (2016.02); *H02J 50/12* (2016.02); *H02J 50/90* (2016.02); *H02J 2310/22* (2020.01)

(58) Field of Classification Search
None
See application file for complete search history.

(56) References Cited

U.S. PATENT DOCUMENTS

2013/0307348 A1 11/2013 Oettinger et al.
2015/0162755 A1 6/2015 Inoue et al.
(Continued)

FOREIGN PATENT DOCUMENTS

KR 1020150056345 5/2015
KR 1020160061121 5/2016
(Continued)

OTHER PUBLICATIONS

International Search Report dated Apr. 19, 2022 issued in counterpart application No. PCT/KR2022/000309, 10 pages.
(Continued)

*Primary Examiner* — Daniel Kessie
(74) *Attorney, Agent, or Firm* — The Farrell Law Firm, P.C.

(57) ABSTRACT

According to various embodiments, there may be provided an electronic device comprising a coil, an inverter configured to provide power to the coil, a power providing circuit, a communication circuit, and a control circuit, wherein the control circuit is configured to control the power providing circuit to apply a first voltage to an input terminal of the inverter, the inverter outputting a first magnitude of power based on the application of the first voltage, control the power providing circuit to apply a second voltage lower than the first voltage to the input terminal of the inverter, based on the application of the first voltage being maintained for (Continued)

a specific time, identify, through the communication circuit, a first control error packet from the wireless power receiving device, while applying the second voltage, and identify a first value included in the first control error packet.

9 Claims, 20 Drawing Sheets

(56) References Cited

U.S. PATENT DOCUMENTS

| | | |
|---|---|---|
| 2016/0372956 A1 | 12/2016 | Jung et al. |
| 2017/0331334 A1 | 11/2017 | Park |
| 2018/0219430 A1 | 8/2018 | Russell et al. |
| 2020/0021126 A1 | 1/2020 | Seo et al. |
| 2020/0127501 A1* | 4/2020 | Song ................ H02M 7/48 |
| 2020/0227954 A1* | 7/2020 | Ding ................. H02J 50/10 |
| 2020/0235784 A1 | 7/2020 | Youn et al. |
| 2021/0194296 A1 | 6/2021 | Jo et al. |

FOREIGN PATENT DOCUMENTS

| | | |
|---|---|---|
| KR | 1020170025680 | 3/2017 |
| KR | 1020170095497 | 8/2017 |
| KR | 10-1812444 | 12/2017 |
| KR | 1020170140734 | 12/2017 |
| KR | 10-2018-0038159 | 4/2018 |
| KR | 1020180123891 | 11/2018 |
| KR | 1020190061359 | 6/2019 |
| KR | 1020200113012 | 10/2020 |
| KR | 1020210100876 | 8/2021 |
| WO | WO 2013/176751 | 11/2013 |
| WO | WO 2020/050539 | 3/2020 |

OTHER PUBLICATIONS

European Search Report dated May 6, 2024 issued in counterpart application No. 22739589.4-1002, 7 pages.

* cited by examiner

ELECTRONIC DEVICE WIRELESSLY TRANSMITTING POWER, WIRELESS POWER RECEPTION DEVICE WIRELESSLY RECEIVING POWER, AND METHOD FOR OPERATING THE SAME

CROSS-REFERENCE TO RELATED APPLICATIONS

This application is a Bypass Continuation application of International Application No. PCT/KR2022/000309, which was filed on Jan. 7, 2022, and is based on and claims priority under 35 U.S.C. § 119 to Korean Patent Application No. 10-2021-0007086, which was filed in the Korean Intellectual Property Office on Jan. 18, 2021, the entire disclosure of each of which is incorporated herein by reference.

BACKGROUND

1. Field

The disclosure relates to electronic devices, for wirelessly transmitting power, wireless power receiving devices for wirelessly receiving power, and methods for operating the same.

2. Description of Related Art

There has been a steady increase in the use of portable electronic devices, such as smart phones, tablet personal computers (PCs), and wearable devices, and it is common for one user to use multiple portable electronic devices. Since the portable electronic device may include a rechargeable secondary battery, the user may use the electronic device for a designated time even when a separate external power source is not provided. The secondary battery may be recharged in a wired scheme or a wireless scheme. The wireless charging scheme converts electrical energy into an electromagnetic wave having a frequency suitable for different electronic devices and may wirelessly transfer it without a transmission line. For example, one or more electronic devices may be charged by one wireless power transmitting device (e.g., a charging pad).

The wireless power transfer technology is a scheme for transferring power using the electromagnetic field induced around the coil and may supply electrical energy by generating an electromagnetic field by applying current to the transmission coil and forming an induced current through the reception coil by the generated electromagnetic field.

The electronic device (e.g., wireless power transmitting device) may apply voltage to the input terminal of the inverter of the electronic device based on identifying placement of a wireless power receiving device, so that the inverter may input alternating current (AC) power to the transmission coil, and power may be transferred from the transmission coil of the electronic device to the wireless power receiving device (e.g., the reception coil). If the wireless power receiving device is misaligned on the electronic device, the power transfer efficiency between the transmission coil and the reception coil may be drastically decreased, and heat generated from the electronic device or the wireless power receiving device may increase. To prevent misalignment of the wireless powered receiving device, the electronic device may be implemented to have an area limited to facilitate alignment of the wireless power receiving device in which case use convenience of the electronic device may be deteriorated.

According to various embodiments of the disclosure, there may be provided a wireless charging method, in which an electronic device (e.g., a wireless power transmitting device) may perform responsive operations related to detection of a misalignment based on identifying a value included in the packet (e.g., control error packet) received from the wireless power receiving device according to the state of the power supplied to the transmission coil, and an electronic device supporting the same.

SUMMARY

The disclosure has been made to address at least the above-mentioned problems and/or disadvantages and to provide at least the advantages described below.

According to various embodiments, there may be provided an electronic device comprising a coil, an inverter configured to provide power to the coil, a power providing circuit, a communication circuit, and a control circuit, wherein the control circuit is configured to control the power providing circuit to apply a designated first voltage to an input terminal of the inverter, the inverter outputting a first magnitude of power based on the application of the first voltage, control the power providing circuit to apply a second voltage lower than the first voltage to the input terminal of the inverter, based on the application of the first voltage being maintained for a designated time, identify, through the communication circuit, a first control error packet from the wireless power receiving device, while applying the second voltage, and identify a first value included in the first control error packet.

According to various embodiments, there may be provided a method for operating an electronic device, comprising controlling a power providing circuit of the electronic device to apply a designated first voltage to an input terminal of an inverter of the electronic device, the inverter outputting a first magnitude of power based on the application of the first voltage, controlling the power providing circuit to apply a second voltage lower than the first voltage to the input terminal of the inverter, based on the application of the first voltage being maintained for a designated time, identifying, through a communication circuit of the electronic device, a first control error packet from a wireless power receiving device, while applying the second voltage, and identifying a first value included in the first control error packet.

According to various embodiments, there may be provided an electronic device comprising a coil, an inverter configured to provide power to the coil, a power providing circuit, a communication circuit, and a control circuit, wherein the control circuit is configured to control the power providing circuit to apply a designated first voltage to an input terminal of the inverter, the inverter outputting a first magnitude of power based on the application of the first voltage, control the power providing circuit to apply a second voltage lower than the first voltage to the input terminal of the inverter, based on the application of the first voltage being maintained for a designated time, identify, through the communication circuit, a first control error packet received from the wireless power receiving device, while applying the second voltage, identify a first value, which is a positive value, included in the first control error packet, compare the first value with a designated threshold value, identify that the wireless power receiving device is misaligned when the first value is larger than the threshold value, and control the power providing circuit to apply a third voltage lower than the second voltage to the input terminal of the inverter when the first value is smaller than the threshold value.

According to various embodiments, the foregoing objectives, and other objectives would readily be appreciated by a skilled artisan from the following detailed description taken in conjunction with the accompanying drawings.

According to various embodiments, there may be provided an electronic device (e.g., a wireless power transmitting device) for detecting a placement state (e.g., an alignment or misalignment) of the wireless power receiving device based on identifying a value included in the control error packet received from the wireless power receiving device and reducing heat generation due to a misalignment, a wireless power receiving device, and a method for operating the same.

According to various embodiments, there may be provided an electronic device, a wireless power receiving device, and a method for operating the same, which may enhance use convenience of an electronic device by allowing the electronic device to perform a control operation for reducing heat generation due to a misalignment.

Other various effects may be provided directly or indirectly in the disclosure.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
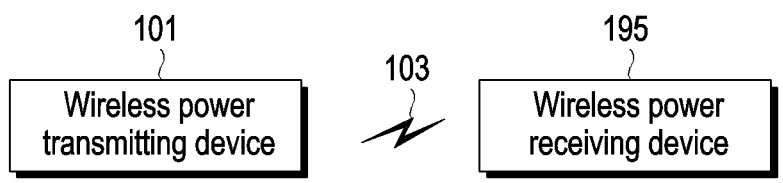
FIG. 1 is a block diagram illustrating an electronic device (e.g., a wireless power transmitting device) and a wireless power receiving device according to various embodiments.

Hereinafter, embodiments of the disclosure will be described in detail with reference to the accompanying drawings. It should be noted that, in the drawings, the same or like elements are designated by the same or like reference signs as much as possible. In the following description and drawings, a detailed description of known functions or configurations that may make the subject matter of the disclosure unnecessarily unclear will be omitted.

FIG. 1 is a block diagram illustrating an electronic device 101 (e.g., a wireless power transmitting device) and a wireless power receiving device 195 according to various embodiments.

Referring to FIG. 1, according to various embodiments, an electronic device 101 may wirelessly transmit power 103 to a wireless power receiving device 195. For example, the electronic device 101 may transmit the power 103 by an induction scheme. Adopting the induction scheme, the electronic device 101 may include, e.g., a power source, a direct current (DC)-alternating current (AC) converting circuit, an amplifying circuit, an impedance matching circuit, at least one capacitor, at least one coil, or a communication modulation/demodulation circuit. The at least one capacitor together with the at least one coil may form a resonance circuit. According to an embodiment, the electronic device 101 may be implemented in a scheme defined in the wireless power consortium (WPC) standards (or Qi standards). As another example, the electronic device 101 may transmit the power 103 by a resonance scheme. Adopting the resonance scheme, the electronic device 101 may include, e.g., a power source, a DC-AC converting circuit, an amplifying circuit, an impedance matching circuit, at least one capacitor, at least one coil, or an out-of-band communication circuit (e.g., a Bluetooth low energy (BLE) communication circuit). The at least one capacitor and the at least one coil may form a resonance circuit. The electronic device 101 may be implemented in a manner defined in the alliance for wireless power (A4WP) standards (or air fuel alliance (AFA) standards). The electronic device 101 may include a coil that is capable of produce a magnetic field when letting an electric current flow thereacross by a resonance or induction scheme. The operation of the electronic device 101 producing an induced magnetic field may be represented as the electronic device 101 wirelessly transmitting the power 103. According to an embodiment, the wireless power receiving device 195 may include a coil that produces an induced electromotive force by the magnetic field generated around and varying in magnitude over time. The operation of producing an induced electromotive force through the coil may be represented as the 'wireless power receiving device 195 wirelessly receives the power 103.' For example, the electronic device 101 may be implemented in the manner defined in wireless power transmission-related standards, e.g., the airfuel inductive (e.g., power matters alliance (PMA)) or airfuel resonant (e.g., rezence) standards, or a Qi standard.

According to various embodiments, the electronic device 101 may communicate with the wireless power receiving device 195. For example, the electronic device 101 may communicate with the wireless power receiving device 195 according to an in-band scheme. The electronic device 101 may modulate data to be transmitted according to, e.g., a frequency shift keying (FSK) modulation scheme, and the wireless power receiving device 195 may perform modulation according to an amplitude shift keying (ASK) modulation scheme. The electronic device 101 and/or the wireless power receiving device 195 may determine the data transmitted from the counterpart device based on the frequency and/or amplitude of the current, voltage, or power of the coil. The operation of performing modulation based on the ASK modulation scheme and/or the FSK modulation scheme may be understood as an operation for transmitting data according to the in-band communication scheme. The operation of determining the data transmitted from the counterpart device by performing demodulation based on the frequency and/or amplitude of the current, voltage, or power of the coil may be understood as an operation for receiving data according to the in-band communication scheme. For example, the electronic device 101 may communicate with the wireless power receiving device 195 according to an out-of-band scheme. The electronic device 101 or the wireless power receiving device 195 may communicate data using a communication circuit (e.g., a BLE communication module) provided separately from the coil or patch antennas.

Herein, when the electronic device 101 or the wireless power receiving device 195 performs an operation, this may mean that various hardware devices, e.g., a control circuit, such as a processor (e.g., a transmission integrated circuit (IC) or micro controlling unit (MCU)), or coil included in the electronic device 101 or the wireless power receiving device 195 performs the operation. The electronic device 101 or the wireless power receiving device 195 performs an operation may also mean that the processor controls another hardware device to perform the operation. When the electronic device 101 or the wireless power receiving device 195 performs the operation, this may mean that the processor or another hardware device triggers the operation as an instruction for performing the operation, which is stored in a storage circuit (e.g., a memory) of the electronic device 101 or the wireless power receiving device 195, is executed.

Hereinafter, implementation examples of an electronic device and a wireless power receiving device according to various embodiments are described with reference to FIG. 2A.

Figure 2A:
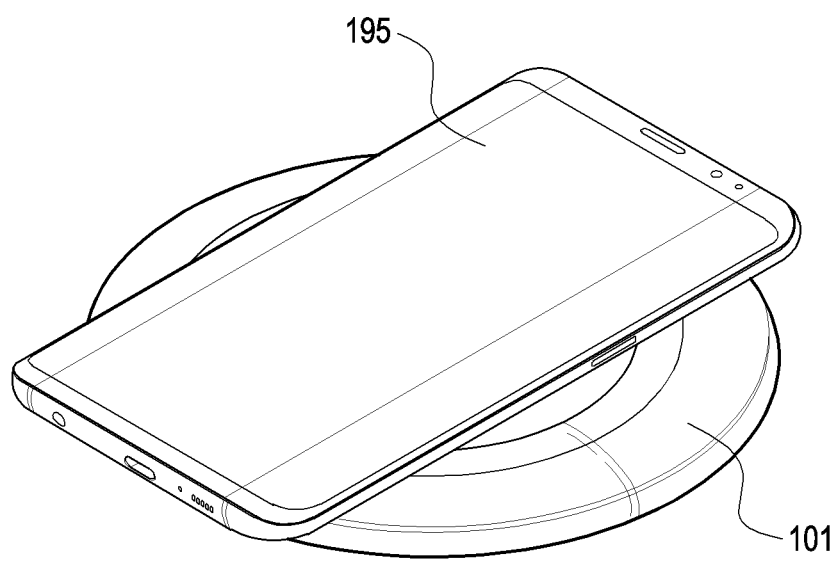
FIG. 2A is a view schematically illustrating a wireless charging system according to various embodiments.

FIG. 2A is a view schematically illustrating a wireless charging system according to various embodiments.

Referring to FIG. 2A, according to various embodiments, a wireless charging system may include an electronic device 101 and a wireless power receiving device 195. For example, if the wireless powered receiving device 195 is placed (or mounted) on the electronic device 101, the electronic device 101 may wirelessly supply power to the wireless powered receiving device 195.

According to various embodiments, the electronic device 101 may include a charging pad that transmits wireless power based on the power supplied from a charger (e.g., a travel adapter (TA)). According to another embodiment, the electronic device 101, as a device including a wireless power transmission function, may be implemented as, e.g., a smart phone, but is not limited thereto. The wireless powered receiving device 195 may include an electronic device, such as a smart phone or a wearable device, and it is not limited in its implementation form (or type).

Hereinafter, an example of a configuration of an electronic device 101 (e.g., a wireless power transmitting device) and a wireless power receiving device 195 according to various embodiments is described with reference to FIG. 2B.

Figure 2B:
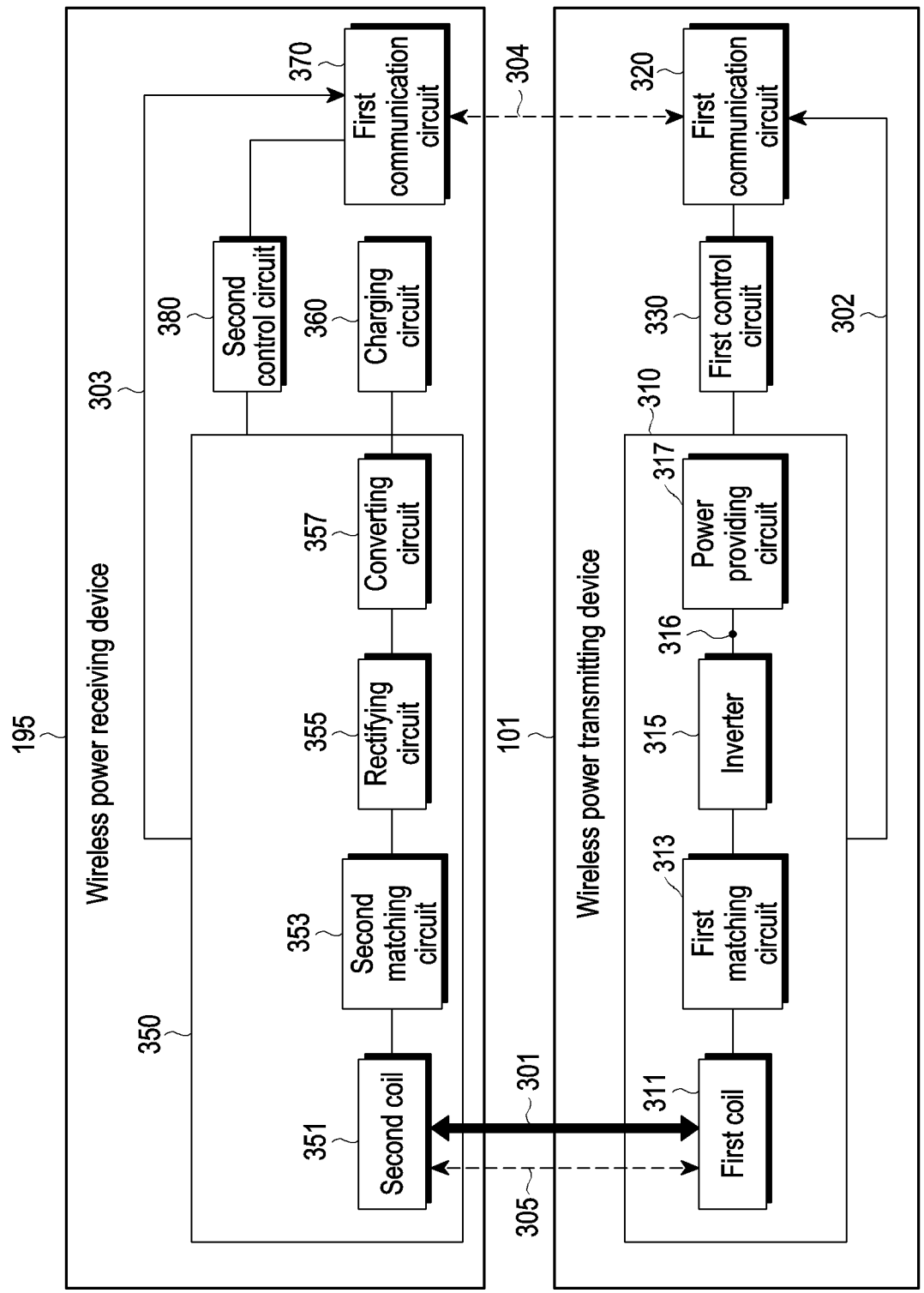
FIG. 2B is a view illustrating an example of a configuration of an electronic device (e.g., a wireless power transmitting device) and a wireless power receiving device according to various embodiments.

FIG. 2B is a view illustrating an example of a configuration of an electronic device 101 (e.g., a wireless power transmitting device) and a wireless power receiving device 195 according to various embodiments. According to various embodiments, without being limited to the components illustrated in FIG. 2B, the electronic device 101 (e.g., wireless power transmitting device) and the wireless power receiving device 195 may be implemented to include more or fewer components.

Referring to FIG. 2B, the electronic device 101 (e.g., a wireless power transmitting device) may include a power transmission circuit 310 including a first coil 311, a first matching circuit 313, an inverter 315, and/or a power providing circuit 317, a first communication circuit 320, and/or a first control circuit 330. The wireless power receiving device 195 may include a power reception circuit 350 including a second coil 351, a second matching circuit 353, a rectifying circuit 355, and/or a converting circuit 357, a charging circuit 360, a second communication circuit 370, and/or a second control circuit 380. The operation of each of the components (e.g., the power transmission circuit 310, the first communication circuit 320, the power reception circuit 350, the charging circuit 360, and the second communication circuit 370) described below may be performed under the control of the first control circuit 330 or the second control circuit 380.

Hereinafter, the components of the electronic device 101 (e.g., a wireless power transmitting device) are described.

According to various embodiments, the power transmission circuit 310 may wirelessly transmit power 301 as per at least one of an induction scheme, a resonance scheme, or an electromagnetic wave scheme. For example, the power providing circuit 317 may receive external power and may apply, e.g., a direct current (DC) driving voltage (e.g., voltage drain (VDD)) (or VRAIL, which is described below in FIGS. 4 to 6) to an input terminal 316 of the inverter 315 (e.g., the drain of the metal oxide semiconductor field effect transistor (MOSFET) or one end of the switch). The driving voltage may be a DC voltage. Although not shown, according to an embodiment, the power transmission circuit 310 may further include a power management IC (PMIC). The PMIC may receive power from the power providing circuit 317 and apply a driving voltage (e.g., VDD) to the input terminal 316 of the inverter 315. The inverter 315 may output AC power (or voltage or current) to the first coil 311 while the driving voltage is applied to the input terminal 316 (e.g., AC power is provided to the first coil 311 according to the on/off control of the switch or the MOSFET included in the inverter 315). The power may be alternating current (AC) power (or voltage or current). The frequency of the AC power may be set to about 100 kilohertz (kHz) to about 205 kHz or about 6.78 megahertz (MHz) according to standards (e.g., Qi or AFA), but is not limited thereto. For example, the inverter 315 may be a full-bridge inverter or a half-bridge inverter but is not limited thereto. Although not shown, according to an embodiment, the power transmission circuit 310 may further include an amplifier. The power (or voltage, or current) output from the inverter 315 may be transferred to the amplifier, amplified by the amplifier, and transferred to the first coil 311. When power (or voltage, or current) is applied to the first coil 311, an induced magnetic field having magnitude that is changed over time may be formed from the first coil 311, so that power 301 may be wirelessly transmitted. Although not shown, according to an embodiment, the power transmission circuit 310 may include at least one capacitor, together with the first coil 311, forming a resonance circuit. The first matching circuit 313 may impedance-match the power transmission circuit 310 with the power reception circuit 350 by varying at least one of the capacitance or reactance of the circuit connected with the first coil 311 under the control of the control circuit 330. The first coil 311 may be implemented as a single coil (e.g., the first coil 311 of FIG. 3A) but, without being limited thereto, the first coil 311 may be implemented as a plurality of coils (e.g., the plurality of subcoils of FIG. 3B (e.g., the first subcoil 311a, the second subcoil 311b, the third subcoil 311c, the fourth subcoil 311d, or the fifth subcoil 311e)). The plurality of coils (e.g., the plurality of subcoils of FIG. 3B (e.g., the first subcoil 311a, the second subcoil 311b, the third subcoil 311c, the fourth subcoil 311d, or the fifth subcoil 311e) each are not limited to those illustrated in FIG. 3B and may be implemented in various sizes and disposed at various intervals. For example, the plurality of coils may be arranged to overlap each other. For example, at least a portion of a subcoil may be disposed on at least a portion of another subcoil. In this case, the electronic device 101 may select at least one subcoil from among the plurality of subcoils and transmit power to the wireless power receiving device 195 using the selected at least one subcoil. The following operation for transmitting power to the first coil 195 may be applied to an operation for transmitting power to the selected at least one subcoil.

According to various embodiments, the first communication circuit 320 may be implemented as a communication circuit of an in-band communication scheme or a communication circuit of an out-band communication scheme (e.g., a Bluetooth communication module or an NFC communication module). Hereinafter, an implementation example of a communication circuit of an in-band communication scheme and an implementation example of a communication circuit of an out-band communication scheme are described.

First, a case in which the first communication circuit 320 is implemented as a communication circuit of an in-band scheme is described.

According to various embodiments, the first communication circuit 320 may communicate (305) with the second communication circuit 370 of the wireless power receiving device 195 based on an in-band (IB) communication scheme, using a frequency identical or adjacent to the frequency used for transferring power from the first coil 311. For example, although not shown, the wireless power receiving device 195 may include a switch connected to the second coil 351 directly or through another element or a dummy load (e.g., a dummy inductor or a dummy capacitor) connected to the coil directly or through another element, through the switch. The wireless power receiving device 195 may represent data to be transmitted, by controlling the switch. The electronic device 101 may identify a change in the amplitude 302 in the first coil 311 and may identify the data represented by the wireless power receiving device 195 by demodulating the amplitude change. The first communication circuit 320 may demodulate the sensed amplitude 302. In an embodiment, the first communication circuit 320 may identify (302) information, a signal, or a packet received from the wireless power receiving device 195 in an IB scheme. As an example, referring to FIG. 2B, as information, signals, or packets are transmitted from the wireless power receiving device 195 in an IB scheme, the first communication circuit 320 (e.g., a sensing circuit included in the first communication circuit 320 may identify (or detect) (302) a change in voltage, current, or frequency between the first coil 311 and the first matching circuit 313 according to a change in the load caused by the wireless power receiving device 195. The first communication circuit 320 (e.g., a demodulator included in the first communication circuit 320) may demodulate the identified change (a change in voltage, current, or frequency) and identify it as information. As an example, the electronic device 101 may identify the control error packet (e.g., a control error packet according to the Qi standard) received from the wireless power receiving device 195 by the first communication circuit 320. According to an embodiment, the data (or communication signal) generated by the first communication circuit 320 may be transmitted using the first coil 311. The first communication circuit 320 may transfer data to the wireless power receiving device 195 using an FSK modulation scheme. The first communication circuit 320 may communicate with the second communication circuit 370 of the wireless power receiving device 195 by allowing the frequency of the power signal transferred through the transmission coil 311 to be changed (e.g., performing modulation by increasing or decreasing the frequency of the power transmission signal). As another example, the first communication circuit 320 may communicate with the second communication circuit 370 of the wireless power receiving device 195 by allowing data to be included in the power signal generated by the power transmission circuit 310. In this case, the wireless power receiving device 195 may identify the data from the electronic device 101 by performing demodulation based on the frequency of the signal measured at the second coil 351.

Hereinafter, a case in which the first communication circuit 320 is implemented as a communication circuit of an out-band scheme is described.

According to various embodiments, the first communication circuit 320 may communicate (304) with the second communication circuit 370 of the wireless power receiving device 195 based on an out-of-band (OOB) communication scheme, using a frequency different from the frequency used for transferring power from the first coil 311. For example, the second communication circuit 370 may obtain data from the second communication circuit 370 using any one of various short-range communication schemes, such as Bluetooth, BLE, Wi-Fi, or near field communication (NFC). For example, the wireless power receiving device 195 may transmit the CEP defined in Qi to the electronic device 101 based on an out-of-band communication scheme.

According to various embodiments, the first control circuit 330 may control the overall operation of the electronic device 101. In an embodiment, the first control circuit 330 may generate various messages (e.g., instructions) (or packets) required for wireless power transmission and transfer the generated messages to the first communication circuit 320. In an embodiment, the first control circuit 330 may calculate the power (or amount of power) to be transmitted to the wireless power receiving device 195 based on the information (e.g., control error packet) identified through the first communication circuit 320 (or received through the first communication circuit 320). In an embodiment, the first control circuit 330 may control the magnitude of the driving voltage (e.g., VDD)(or Vrail to be described below) applied to the input terminal 316 of the inverter 315, thereby controlling the magnitude of the power transferred from the first coil 311 to the wireless power receiving device 195. As another example, the first control circuit 330 may change the frequency applied to the first coil 311 by changing the frequency of the gate driving signal of the inverter 315, thus controlling the magnitude of the power transferred to the wireless power receiving device 195. For example, the first control circuit 330 may increase the frequency applied to the first coil 311 by increasing the frequency of the gate driving signal, so that the magnitude of the power transferred to the wireless power receiving device 195 may be decreased. As another example, the first control circuit 330 may reduce the frequency applied to the first coil 311 by reducing the frequency of the gate driving signal, so that the magnitude of the power transferred to the wireless power receiving device 195 may be increased. As another example, the first control circuit 330 may maintain the frequency applied to the first coil 311 by maintaining the frequency of the gate driving signal, so that the magnitude of the power transferred to the wireless power receiving device 195 may be maintained. For example, the first control circuit 330 may change the switching frequency using the inverter, so that the matching state of the resonant frequency characteristics of the second coil 351 of the wireless power receiving device 195 and the signal induced at the first coil 311 or the first coil 311 and the signal generated using the inverter may be changed. As the first control circuit 330 increases the frequency, the matching state and the resonant frequency characteristics of the first coil 311 or the second coil 351 may worsen, and the magnitude of the power transferred to the wireless power receiving device 195 may be reduced. As the first control circuit 330 reduces the frequency, the matching state and the resonant frequency characteristics of the first coil 311 or the second coil 351 may be enhanced, and the magnitude of the transferred power may be increased. According to an embodiment, the first control circuit 330 may stepwise drop (or reduce) the magnitude of the driving voltage (or power) applied to the input terminal of the inverter 315 based on the designated driving voltage (Vrail_target described below) applied to the input terminal 316 of the inverter 315 being maintained for a designated time. Meanwhile, according to various embodiments, it will be appreciated by one of ordinary skill in the art that the operation of "dropping (or reducing) the magnitude of the driving voltage (or power)" may be replaced with the operation of "adjusting the frequency of the gate driving signal." The first control circuit 330 may identify the value of the information (e.g., control error packet) identified through the first communication circuit 320 and identify (or detect) the placement state (e.g., alignment or misalignment) of the wireless power receiving device 195 based on the identified value, which is described below with reference to FIGS. 4 to 6. The first control circuit 330 may be implemented in various circuits capable of performing calculation, such as a central processing unit (CPU) or other general-purpose processors, a mini-computer, an MCU, or a field programmable gate array (FPGA), but not limited in type thereto.

According to various embodiments, the memory (not shown) may store instructions to perform the overall operation of the electronic device 101. For example, the memory (not shown) may store instructions to perform the overall operation of the electronic device 101. As another example, the memory (not shown) may store a lookup table for the relationship between information obtained via the first communication circuit 320 and the magnitude of power to be transmitted or equation information for the relationship between obtained information and the magnitude of power to be transmitted. The memory (not shown) or the memory 156 may be implemented in various types, such as a read only memory (ROM), a random access memory (RAM), or a flash memory, but not limited in type thereto.

Hereinafter, the components of the wireless power receiving device 195 are described.

According to various embodiments, the power reception circuit 350 may wirelessly receive power as per at least one of an induction scheme, a resonance scheme, or an electromagnetic wave scheme from the power transmission circuit 310. An induced electromotive force may be generated at the second coil 351 of the power reception circuit 159 by the magnetic field which varies in magnitude over time and formed around the second coil 351 by the power transmitted from the first coil 311, and accordingly, the power reception circuit 159 may wirelessly receive power. The rectifying circuit 355 may rectify the received AC waveform of power into a DC waveform of power. The converting circuit 357 may adjust the voltage of the power rectified and transfer the voltage to the PMIC or the charging circuit 360. According to an embodiment, the power reception circuit 159 may further include a regulator. Alternatively, the converting circuit 357 may be replaced with a regulator. The second matching circuit 353 may impedance-match the power transmission circuit 310 with the power reception circuit 350 by varying at least one of the capacitance or reactance of the circuit connected with the second coil 351 under the control of the second control circuit 380.

According to various embodiments, the charging circuit 360 (or a charger) may charge a battery (not shown) of the wireless power receiving device 195 with the received regulated power (e.g., DC power). The charging circuit 360 may adjust at least one of the voltage or current of the received power and transfer it to the battery (not shown) of the wireless power receiving device 195. The battery (not shown) may discharge the stored power and transfer it to other hardware (e.g., the second control circuit 380) included in the wireless power receiving device 195.

Although not shown, the wireless power receiving device 195 may further include a power management integrated circuit (PMIC) (not shown). The PMIC may receive power from the power reception circuit 350 and transfer the power to other hardware components, or the PMIC may receive power from the battery (not shown) and transfer the power to other hardware components.

According to various embodiments, the second communication circuit 370 may be implemented as a communication circuit of an in-band communication scheme or a communication circuit of an out-band communication scheme (e.g., a Bluetooth communication module or an NFC communication module). In an embodiment, the second communication circuit 370 may communicate with the electronic device 101 (e.g., the first communication circuit 320) through the second coil 351 in an in-band scheme. The data (or communication signal) generated by the second communication circuit 370 may be transmitted using the second coil 351. The second communication circuit 370 may transfer data to the electronic device 101 using an ASK modulation scheme. For example, the modulator of the second communication circuit 370 may cause a change in the load at the first coil 311 of the electronic device 101 by changing the internal load of the wireless power receiving device 195 according to the modulation scheme. Accordingly, at least one of the voltage, current, or power measured at the first coil 311 (e.g., identified (302) (or detected) by the first communication circuit 320 between the first coil 311 and the first matching circuit 313) may be changed. The first communication circuit 320 of the electronic device 101 may identify the data by the wireless power receiving device 195 by demodulating the change in magnitude. In another embodiment, the wireless power receiving device 195 may identify (or detect) (303) a change in the frequency of the signal applied to the second coil 351. The second communication circuit 370 (e.g., a demodulator included in the second communication circuit 370) may demodulate the identified change (a change in frequency) and identify it as information. In another embodiment, upon communicating in the out-band scheme, the second communication circuit 370 may communicate (304) with the electronic device 101 using any one of various short-range communication schemes, such as Bluetooth. BLE, Wi-Fi, or NFC. A description of the second communication circuit 370 that overlaps the first communication circuit 320 is omitted.

According to various embodiments, the second control circuit 380 may control the overall operation of the wireless power receiving device 195 and may generate various messages (or packets) necessary for wireless power reception and transfer them to the second communication circuit 370. For example, the second control circuit 380 may control other hardware (e.g., the power reception circuit 350, the charging circuit 360, and/or the second communication circuit 370) included in the wireless power receiving device 195. The first control circuit 330 may be implemented in various circuits capable of performing calculation, such as a CPU or other general-purpose processors, a mini-computer, a microprocessor, an MCU, or an FPGA, but not limited in type thereto.

In various embodiments, the number of the above-described coils (e.g., the first coil 311 and the second coil 351) may be one or more. When there are a plurality of coils, the coils may be connected to each other in series or in parallel.

The implementations of the electronic device 101 and the wireless power receiving device 195 that are not described may be embodied according to the requirements in the standards (e.g., the schemes defined in the airFuel inductive (e.g., PMA) or airfuel resonant (e.g., rezence) standard or Qi standard) and, thus, a detailed description thereof is omitted.

Hereinafter, an example placement state of the wireless power receiving device 195 on the electronic device 101 (e.g., a wireless power transmitting device) according to various embodiments is described with reference to FIGS. 3A and 3B.

Figure 3A:
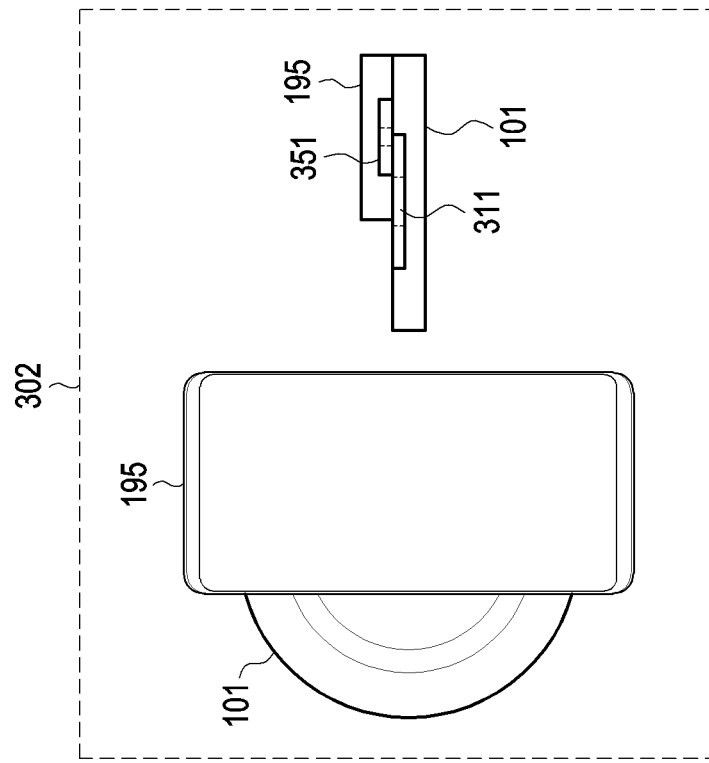
FIG. 3A is a view illustrating an example of a placement state of a wireless power receiving device placed on an electronic device (e.g., a wireless power transmitting device) according to various embodiments.
Figure 3A:
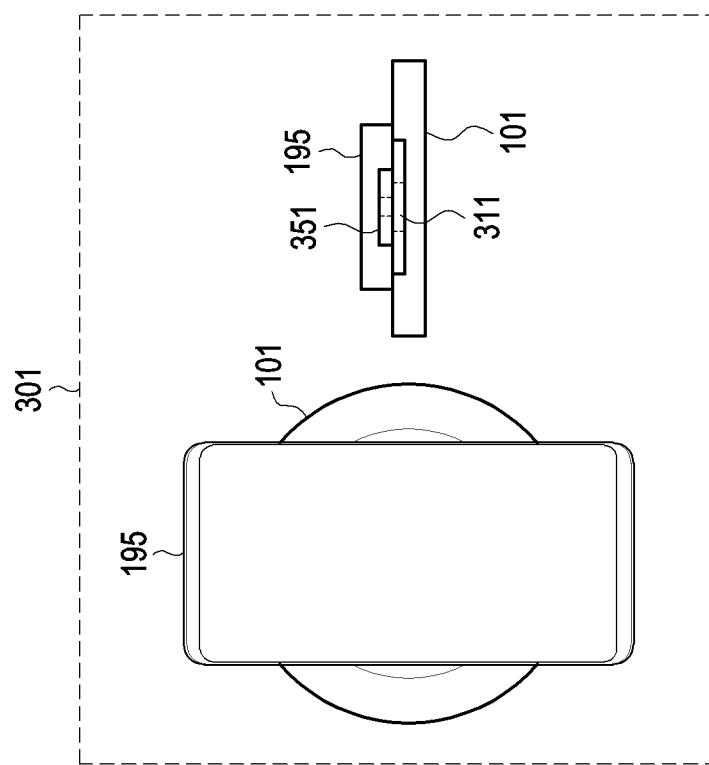

FIG. 3A is a view illustrating an example of a placement state of a wireless power receiving device 195 placed on an electronic device 100 (e.g., a wireless power transmitting device) according to various embodiments. FIG. 3B is a view illustrating another example of a placement state of a wireless power receiving device 195 placed on an electronic device 100 (e.g., a wireless power transmitting device) according to various embodiments.

Figure 3B:
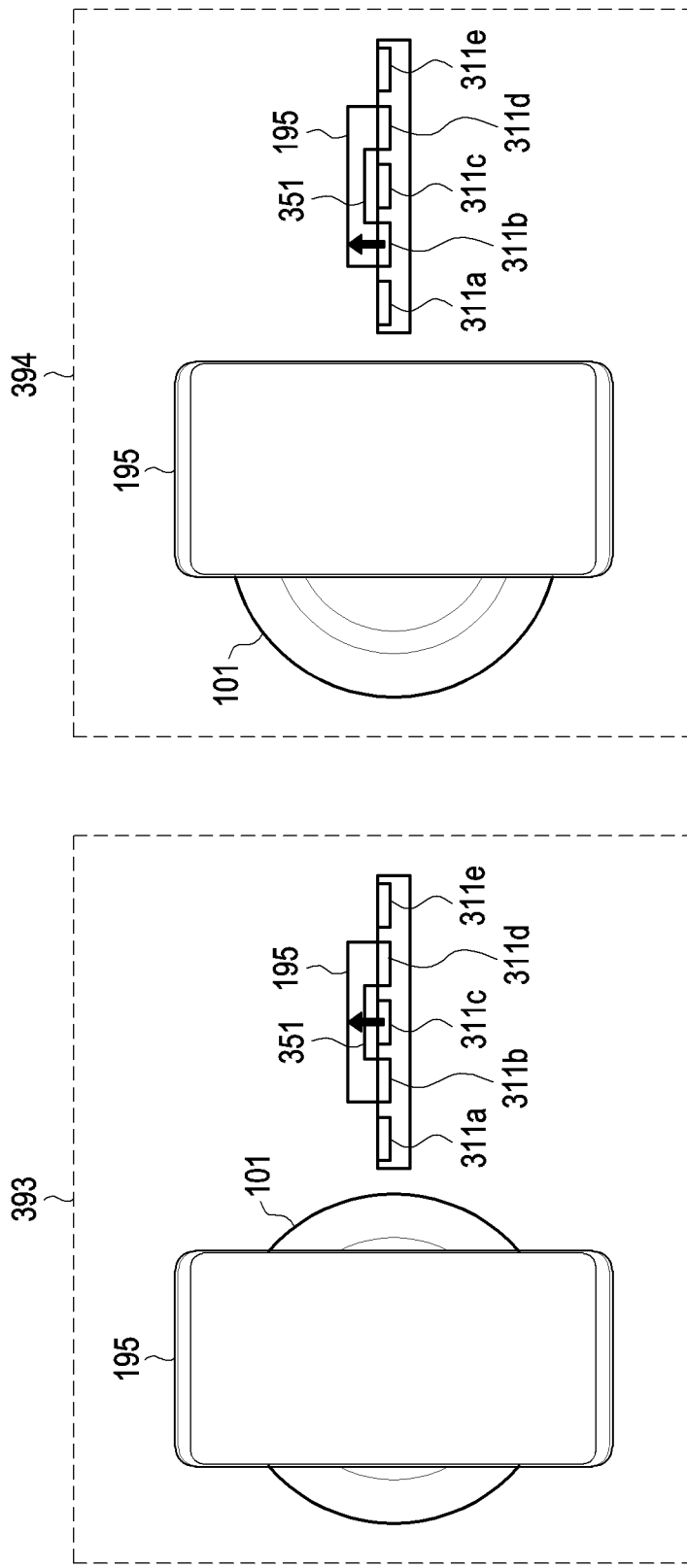
FIG. 3B is a view illustrating another example of a placement state of a wireless power receiving device 195 placed on an electronic device 100 (e.g., a wireless power transmitting device) according to various embodiments.

According to various embodiments, as illustrated in FIGS. 3A and 3B, a wireless power receiving device 195 may be placed (or mounted) on the electronic device 101. The placement state of the wireless powered receiving device 195 may include alignment (391 of FIG. 3A and 393 of FIG. 3B) or misalignment (392 of FIG. 3A and 394 of FIG. 3B).

In the aligned placement state 391 of FIG., when viewed vertically, the wireless power receiving device 195 may be placed on the electronic device 101 so that the center point of the wireless power receiving device 195 (e.g., the center point of the second coil 351) and the center point of the electronic device 101 are positioned to correspond to each other (or identical to each other) or adjacent to each other. As another example, in alignment (393 of FIG. 3B), when viewed vertically, the center point of the wireless power receiving device 195 (e.g., the center point of the second coil 351) may be positioned to correspond (or identical) or adjacent to the center point of one coil selected to transmit power from among the plurality of subcoils (e.g., the first subcoil 311*a*, the second subcoil 311*b*, the third subcoil 311*c*, the fourth subcoil 311*d*, or the fifth subcoil 311*e*) of the electronic device 101 (e.g., a wireless power transmitting device) (e.g., the center point of the third subcoil 311*c*). In this case, as shown, the power transfer efficiency between the second coil 351 and the first coil 311 may be maximized, reducing heat generation and allowing for full charge within a relatively short time.

In the misaligned placement state 392 of FIG. 3A, when viewed vertically, the wireless power receiving device 195 may be placed on the electronic device 101 so that the center point of the wireless power receiving device 195 (e.g., the center point of the second coil 351) is spaced apart from (or away from) the center point of the electronic device 101 (e.g., a wireless power transmitting device) (e.g., the center point of the first coil 311). As another example, in alignment (393 of FIG. 3B), when viewed vertically, the center point of the wireless power receiving device 195 (e.g., the center point of the second coil 351) may be spaced apart from the center point of one coil selected to transmit power from among the plurality of subcoils (e.g., the first subcoil 311*a*, the second subcoil 311*b*, the third subcoil 311*c*, the fourth subcoil 311*d*, or the fifth subcoil 311*e*) of the electronic device 101 (e.g., a wireless power transmitting device) (e.g., the center point of the third subcoil 311*c*). In this case, power transfer efficiency between the second coil 351 and the first coil 311 may be significantly reduced. As the power transfer efficiency reduces, power loss may increase, causing significant heat generation (e.g., overheat). Accordingly, the full charge time of the wireless power receiving device 195 may be delayed.

Accordingly, according to various embodiments of the disclosure, the electronic device 101 (e.g., a wireless power transmitting device) may perform an operation (or algorithm) for detecting the placement state (or misalignment) of the wireless power receiving device 195. In detecting the misalignment of the wireless power receiving device 195, the electronic device 101 may address the above-described issues with misalignment by performing at least one control operation (e.g., driving a fan, controlling the magnitude of the voltage applied to the input terminal 316 of the inverter 315, controlling the magnitude of the power (or voltage or current) transferred to the first coil 311, or changing the subcoil to which the power is to be transmitted).

Hereinafter, an example operation of a wireless charging system according to various embodiments is described.

According to various embodiments, the electronic device 101 (e.g., a wireless power transmitting device) may perform an operation (or algorithm) for detecting the placement state (or misalignment) of the wireless power receiving device 195. The electronic device 101 may drop (or reduce) the magnitude of the voltage applied to the input terminal of the inverter (e.g., the inverter 315 of FIG. 2B) and identify the control error packet received from the wireless power receiving device 195 while dropping (or reducing) the magnitude of the voltage. The electronic device 101 may identify the value of the control error packet and detect the placement state (e.g., alignment or misalignment) of the wireless power receiving device 195 based on the identified value. Even when the value of the control error packet is a positive value, the electronic device 101 may maintain the application of the voltage whose magnitude has been dropped (or reduced) to the input terminal 316 of the inverter (e.g., the inverter 315 of FIG. 2B).

Figure 4:
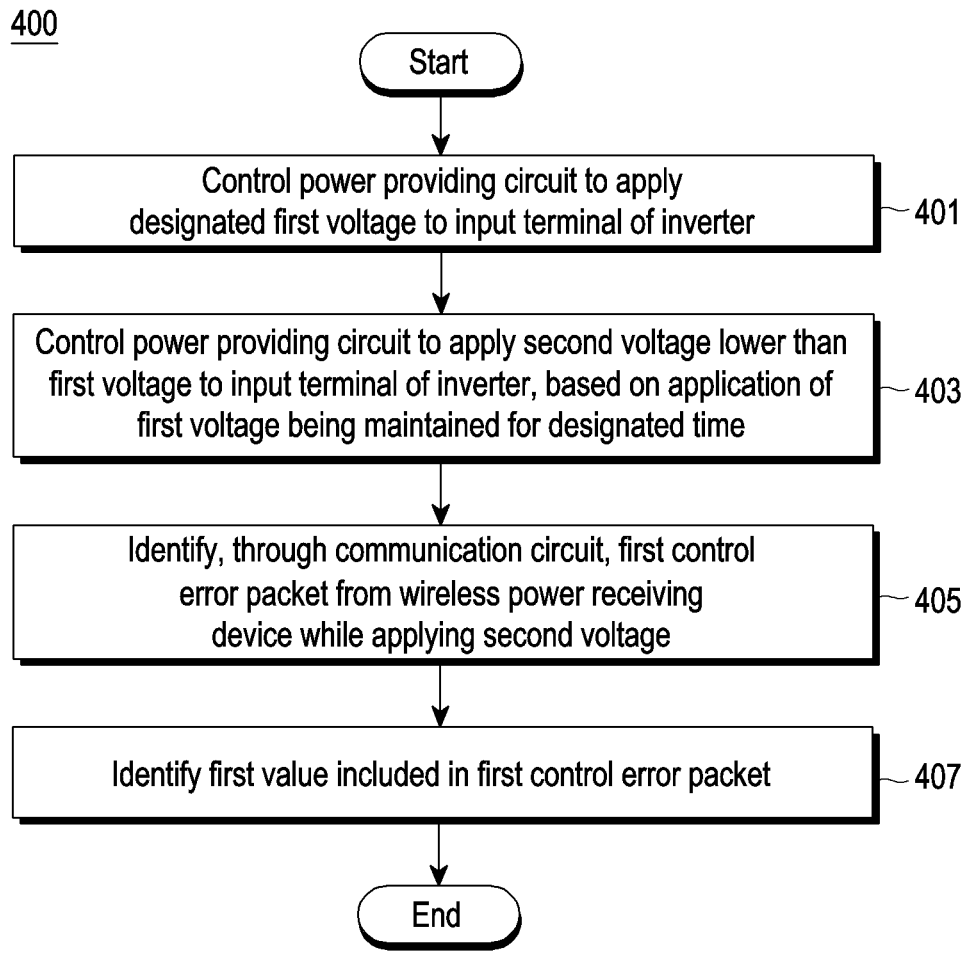
FIG. 4 is a flowchart illustrating an example of an operation of an electronic device according to various embodiments.

FIG. 4 is a flowchart illustrating an example of an operation of an electronic device 101 according to various embodiments. According to various embodiments, the operations shown in FIG. 4 are not limited to the shown order but may rather be performed in other various orders. According to various embodiments, more or less operations than those of FIG. 4 may be performed. FIG. 4 is described below with reference to FIGS. 5 and 6.

Figure 5:
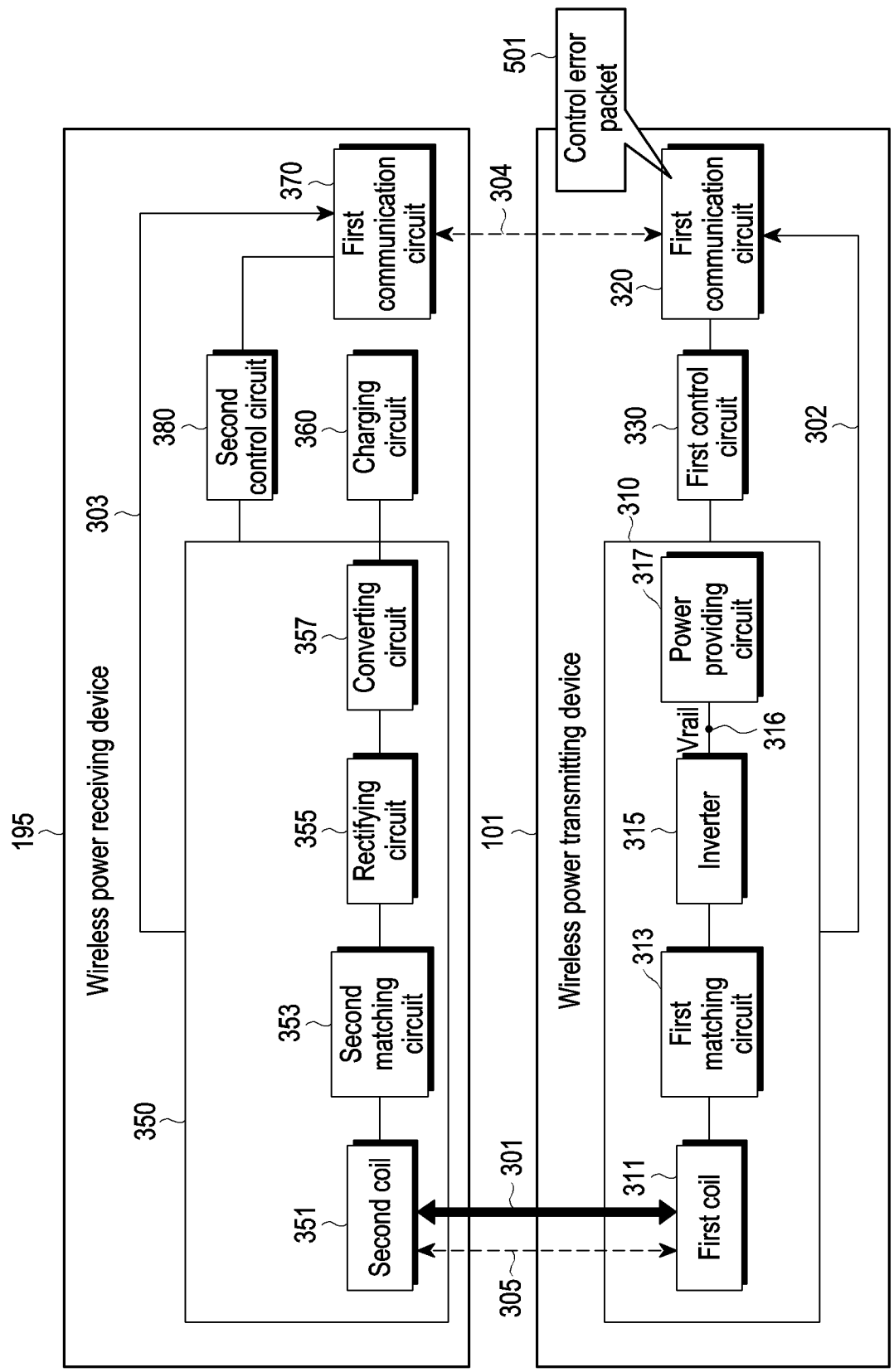
FIG. 5 is a view illustrating a configuration of an electronic device performing an operation of detecting a placement state (or misalignment) of a wireless power receiving device according to various embodiments.
Figure 6:
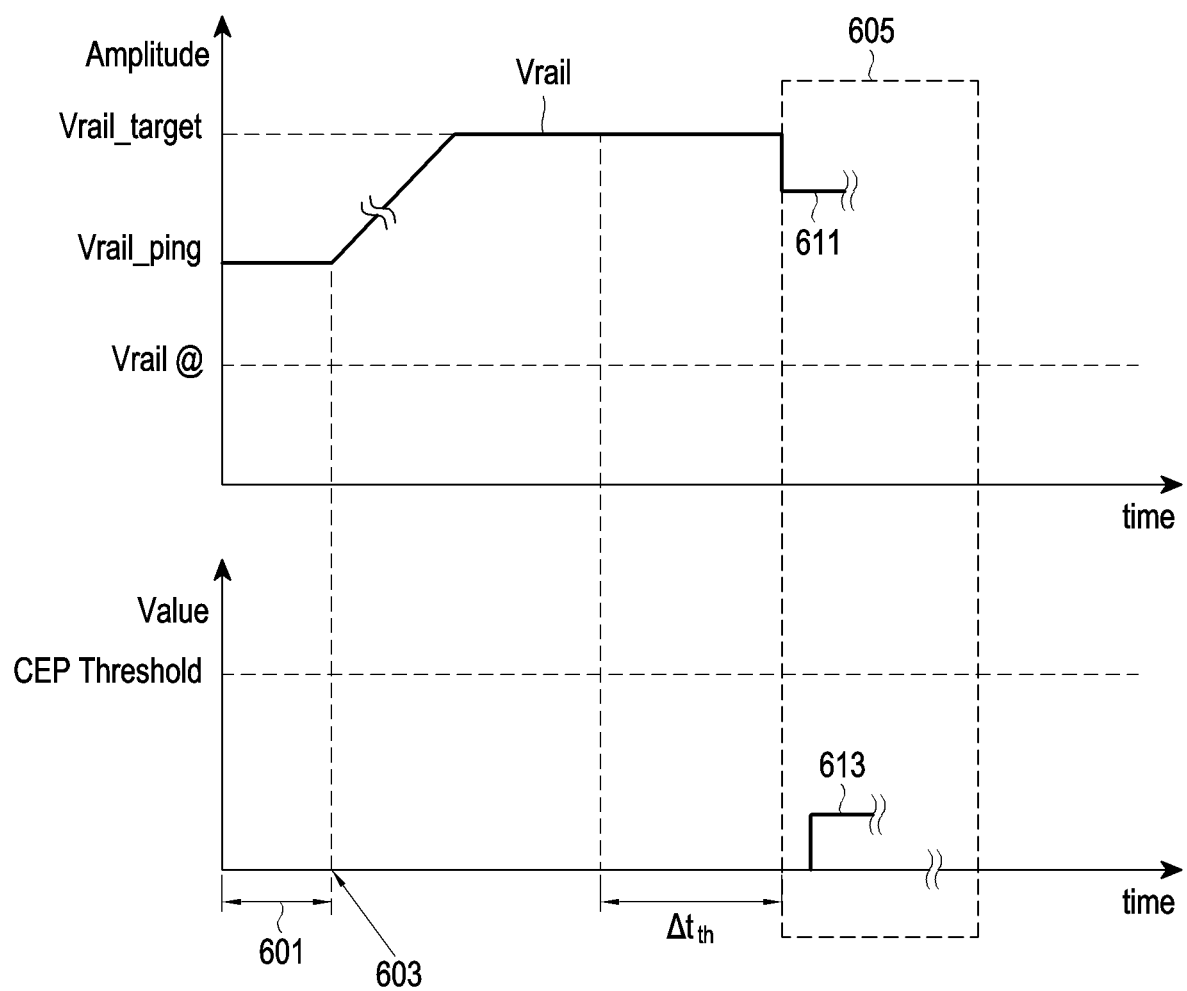
FIG. 6 is a view illustrating an example of an operation of identifying a value of a control error packet and an operation of controlling the magnitude of a driving voltage (e.g., Vrail) of an inverter of an electronic device according to various embodiments.

FIG. 5 is a view illustrating a configuration of an electronic device 101 performing an operation of detecting a placement state (or misalignment) of a wireless power receiving device 195 according to various embodiments. FIG. 6 is a view illustrating an example of an operation of identifying a value of a control error packet and an operation of controlling the magnitude of a driving voltage (e.g., Vrail) of an inverter 315 of an electronic device 101 according to various embodiments.

According to various embodiments, in operation 401, the electronic device 101 may control the power providing circuit (e.g., the power providing circuit 317 of FIG. 5) to apply a designated first voltage (e.g., Vrail_target of FIG. 6) to the input terminal (e.g., the input terminal 316 of FIG. 2B) of the inverter (e.g., the inverter 315 of FIG. 5). For example, upon detecting placement of the wireless power receiving device 195 on the electronic device 101, the electronic device 101 (e.g., the first control circuit 330) may control the power providing circuit 317 to apply the designated first voltage (Vrail_target) to the input terminal 316 of the inverter 315 as shown in FIGS. 5 and 6. As an example, as the electronic device 101 applies the voltage (e.g., Vrail_ping applied during the time period 601) applied to the inverter 315, the electronic device 101 may transmit power (e.g., a ping signal) for wake-up of the second communication circuit 370 of the wireless power receiving device 195. When power is transferred from the first coil 311 to the wireless power receiving device 195 (e.g., the second coil 351), the second communication circuit 370 of the wireless power receiving device 195 may wake up. The second communication circuit 370 of the wireless power receiving device 195 may transmit a response packet to the electronic device 101, e.g., in the in-band scheme, using the second coil 351. The electronic device 101 may identify the response packet, in the in-band scheme, through the first communication circuit 320. Since the in-band communication scheme has been described above, a duplicate description thereof will be omitted. The electronic device 101 may apply, to the input terminal 316 of the inverter 315, a designated first voltage (Vrail_target) corresponding to the power identified to be provided to the wireless power receiving device 195 from the identification time 603. The identification time 603 may be any one of the time of reception of any specific packet, the time of entry into a specific phase, or the time of completion of the specific phase, but is not limited thereto. For example, from the identification time 603, the electronic device 101 may enter the power transmission phase (e.g., the power transfer phase according to the Qi standard) and transmit, to the wireless power receiving device 195, first power having a magnitude corresponding to the designated first voltage (Vrail_target) based on information about the power associated with the wireless power receiving device 195 (e.g., the signal strength packet or the power value (e.g., maximum power value)). As another example, when the electronic device 101 enters the power transmission phase, the electronic device 101 may receive (not shown) a control error packet during a time period 602 after the identification time 603 and increase the voltage applied to the inverter 315 to the first voltage (Vrail_target) to transmit a ping signal, based on the positive value (e.g., greater than or equal to between +1 and +127) included in the received control error packet. For example, the positive value between +1 and +127 included in the control error packet may be a required power amount for which the amount of power transmitted is requested to increase, and the negative value (e.g., a value not less than −128 and less than 0) may be a required power amount for which the amount of power transmitted is requested to decrease. As another example, when there is no positive value or negative value which means the required power amount of the control error packet (e.g., when the value is 0), the current state may be maintained. The above-described operation (e.g., the operation of detecting the placement of the wireless power receiving device 195 and applying the designated first voltage (Vrail_target)) may follow, e.g., the Qi standard, but is not limited thereto. During the time period 602 before performing the operation 605 for detecting the placement state (e.g., alignment or misalignment) of the wireless power receiving device 195 after the identification time 603, the operation of the electronic device 101 may follow the Qi standard, but is not limited thereto, and a specific description thereof is omitted.

According to various embodiments, in operation 403, the electronic device 101 may control the power providing circuit (e.g., the power providing circuit 317 of FIG. 5) to apply a second voltage (e.g., the second voltage 611 of FIG. 6) lower than the first voltage (e.g., Vrail_target of FIG. 6) to the input terminal (e.g., the input terminal 316 of FIG. 2B) of the inverter (e.g., the inverter 315 of FIG. 5) based on the application of the first power being maintained during a designated time (e.g., $\Delta t_{th}$ of FIG. 6). For example, as shown in FIG. 6, the electronic device 101 may perform the operation 605 (or algorithm) for detecting the placement state (e.g., alignment or misalignment) of the wireless power receiving device 195 based on the application of the designated first voltage (Vrail_target) being maintained during the threshold time ($\Delta t_{th}$) (or the frequency of the gate driving signal applied to the inverter 315 being maintained or the frequency applied from the inverter 315 to the first coil 311 being maintained). As another example, the electronic device 101 may identify the control error packet CEP received from the wireless power receiving device 195 while the designated first voltage (Vrail_target) is applied. The control error packet is a packet according to the Qi standard and may be set to include any one value of a positive value (e.g., a value not less than +1 and not more than +127), 0, or a negative value to increase the current applied to the first coil 311 (or to increase the voltage applied to the inverter 315). In this example, a control error packet with a positive value may be received. The electronic device 101 may perform the operation (or algorithm) for detecting the placement state (e.g., alignment or misalignment) of the wireless power receiving device 195 based on identifying that the control error packet is not received during the threshold time. When a designated event occurs, with an occurrence of the designated event used as a trigger condition, the electronic device 101 may perform the operation (or algorithm) for detecting the placement state (e.g., alignment or misalignment) of the wireless power receiving device 195, which is described below with reference to FIGS. 9 to 11. The operation (or algorithm) for detecting the placement state (e.g., alignment or misalignment) of the wireless power receiving device 195 may include an operation of dropping (or reducing) the magnitude of the voltage applied to the input terminal 316 of the inverter 315. In the instant embodiment, although a control error packet with a positive value is received, the electronic device 101 may be configured to rather drop (or reduce) the magnitude of the voltage applied to the input terminal 316 of the inverter 315 so as to identified whether it is aligned/misaligned. Although a control error packet with a positive value is received, the electronic device 101 may drop (or reduce) the magnitude of the voltage applied to the input terminal 316 of the inverter 315 until the magnitude of the voltage (Vrail) becomes a threshold magnitude (Vrail_@). According to various embodiments, the electronic device 101 may perform the operation of dropping (or reducing) the magnitude of the voltage applied to the input terminal 316 of the inverter 315 until the required power amount included in the control error packet CEP received from the wireless power receiving device 195 reaches a designated value or an exceeding value is received.

According to various embodiments, it has been described that as the operation of identifying that the application of the first power is maintained during a designated time (e.g., $\Delta t_{th}$ of FIG. 6) and reducing power in operation 403, the electronic device 101 reduces the second voltage (e.g., the second voltage 611 of FIG. 6) lower than the first voltage (e.g., Vrail_target of FIG. 6). However, without being limited thereto, for example, the electronic device 101 may output the second frequency higher than the first frequency as the frequency applied to the first coil 311 using the inverter 315 (or control the frequency of the gate driving signal applied to the input terminal of the inverter 315 from the first frequency to the second frequency higher than the first frequency) and decrease the power. According to various embodiments, the electronic device 101 (e.g., the first control circuit 330) may control the power providing circuit 317 to drop (or reduce) (e.g., drop by $\Delta V$) the first voltage (Vrail_target) applied to the input terminal 316 of the inverter 315 to the second voltage 611 lower than the first voltage (Vrail_target). As described below, for example, the electronic device 101 may stepwise drop the first voltage (Vrail_target) to the voltage of the threshold magnitude. As another example, without being limited thereto, the electronic device 101 may immediately drop the first voltage (Vrail_target) to the voltage of the threshold magnitude. This is described below in detail in connection with FIGS. 7 and 8. Meanwhile, the operation 605 (or algorithm) for detecting the placement state (e.g., alignment or misalignment) of the wireless power receiving device 195 may be performed when the first voltage (Vrail_target) is maintained or when an occurrence of a designated event (e.g., the event of FIGS. 9 to 11) is identified, regardless of the operation phase of the electronic device 101 (e.g., not only the power transfer phase according to QI but also other phases (e.g., ping phase or identification&configuration phase)) (e.g., in whatever phase).

According to various embodiments, in operation 405, the electronic device 101 may identify, through the communication circuit (e.g., the first communication circuit 320), a first control error packet (e.g., the first control error packet 501 of FIG. 5) from the wireless power receiving device 195 while applying the second voltage (e.g., the second voltage 611 of FIG. 6). For example, the electronic device 101 may transmit, to the wireless power receiving device 195, the second power having a lower magnitude than the first power having the magnitude corresponding to the designated first voltage (Vrail_target) according to application of the second voltage 611. The wireless power receiving device 195 may transmit, to the electronic device 101, the first control error packet 501 for identifying the second power and increasing the power (e.g., the second power) received from the electronic device 101, in the in-band scheme. As illustrated in FIG. 6, the first control error packet 501 may be transmitted from the wireless power receiving device 101 after the time when the second voltage 611 is applied. The first control error packet 501 may include a positive value 613 (e.g., a value not less than +1 and not more than +127) corresponding to the difference between the magnitude of the first power (or the first voltage (Vrail_target)) and the second power (or the second voltage 611). As illustrated in FIG. 6, the electronic device 101 may identify (or detect) the first control error packet 501 through the first communication circuit 320, in the in-band scheme, while applying the second voltage 611.

According to various embodiments, in operation 407, the electronic device 101 may identify the first value included in the first control error packet. For example, as shown in FIG. 6, the electronic device 101 may identify the positive value (e.g., a value not less than +1 and not more than +127) corresponding to the difference between the magnitude of the first power (e.g., the power corresponding to the designated first voltage (Vrail_target)) and the magnitude of the second power (e.g., the power corresponding to the second voltage 611 lower than the first voltage (Vrail_target)), included in the first control error packet 501. The electronic device 101 may compare the identified positive value 613 with the threshold value (CEP_threshold) stored in the electronic device 101, thereby identifying the placement state of the wireless power receiving device 195. For example, when the identified positive value 613 is larger than the threshold value (CEP_threshold), the placement state of the wireless power receiving device 195 may be identified as misalignment. When the identified positive value 613 is smaller than the threshold value (CEP_threshold), the electronic device 101 may identify that the placement state of the wireless power receiving device 195 is alignment or may continuously perform the operation of detecting the placement state (e.g., performing the operation of dropping the voltage (Vrail) until the magnitude of the voltage (Vrail) applied to the inverter 315 reaches the threshold magnitude (Vrail_(@)) and comparing the identified positive value 613 with the threshold value (CEP_threshold)). For example, in identifying the positive value, if the positive value 613 is smaller than the threshold value (CEP_threshold), and the magnitude of the voltage (e.g., the second voltage 611) applied to the inverter 315 does not correspond to the threshold voltage (Vrail_@), the electronic device 101 may control the power providing circuit 317 to continuously apply a third voltage lower than the second voltage 611 to the input terminal 316 of the inverter 315. The threshold value (CEP_threshold) may be a value pre-stored in the electronic device 101 to detect a misalignment of the wireless power receiving device 195 (or identify the placement state of the wireless power receiving device 195). For example, the threshold value (CEP_threshold) may be a value included in the control error packet received from the wireless power receiving device 195 when the wireless power receiving device 195 is misaligned. According to an embodiment, when the threshold voltage (e.g., Vrail_@) is applied to the input terminal 316 of the inverter 315 in a state in which the wireless power receiving device 195 is misaligned on the electronic device 101 (or in a state in which overheat occurs), it may be a value included in the control error packet received from the wireless power receiving device 195 (or a value lower by a designated difference than the value included in the control error packet). The electronic device 101 may store the value and use it in the operation of detecting a misalignment of the wireless power receiving device 195. The threshold value may vary for each type of the wireless power receiving device, which is described below with reference to FIGS. 12 to 14.

As another example, without being limited thereto, according to various embodiments, the electronic device 101 may determine the alignment state (e.g., alignment or misalignment) of the wireless power receiving device 195 based on the voltage (Vrail) applied to the input terminal 316 of the inverter 315. For example, when the positive value 613 included in the control error packet (e.g., the first control error packet 501) exceeds (or is not less than) the threshold value (CEP_threshold), the electronic device 101 may identify the voltage (Vrail) applied to the input terminal of the inverter 315 and determine the alignment state (e.g., alignment or misalignment) of the wireless power receiving device 195 based on the identified voltage (Vrail). In an embodiment, when the identified voltage (Vrail) is a threshold voltage (Vrail_@) or less, the electronic device 101 may determine that the wireless power receiving device 195 is misaligned. In an embodiment, when the identified voltage (Vrail) exceeds the threshold voltage (Vrail_@), the electronic device 101 may determine that the wireless power receiving device 195 is aligned. As another example, when the positive value 613 included in the control error packet (e.g., the first control error packet 501) is less than the threshold value (CEP_threshold), the electronic device 101 may continue the operation of comparing the identified voltage (Vrail) with the threshold voltage (Vrail_@) while dropping the voltage (Vrail) so that the positive value 613 increases to reach the threshold value (CEP_threshold).

According to various embodiments, separately from the operation of comparing the value (CEP_value) included in the control error packet with the threshold value (CEP_threshold) or the operation of comparing the voltage (Vrail) applied to the input terminal 316 of the inverter 315 with the threshold voltage (Vrail_@) to determine the alignment state of the wireless power receiving device 195, the electronic device 101 may also identify the placement state (e.g., alignment or misalignment) of the wireless power receiving device 195 based on a variation in the value (CEP_value) included in the control error packet or a variation in the voltage (Vrail). As an example, variations in the values included in the control error packet identified while the voltage (Vrail) applied to the input terminal 316 of the inverter 315 drops to a designated magnitude may differ depending on the placement state (e.g., alignment or misalignment) of the wireless power receiving device 195. As an example, in a case where the voltage (Vrail) drops to a designated magnitude, the variation in the positive value included in the control error packet 501 when the wireless power receiving device 195 is misaligned may be larger than the variation in the positive value included in the control error packet when the wireless power receiving device 195 is aligned. As another example, the variation in the voltage (Vrail) applied (or identified) while increasing the value (CEP_value) included in the control error packet to a designated magnitude may differ depending on the placement state (e.g., alignment or misalignment) of the wireless power receiving device 195. For example, in a case where the value (CEP_value) included in the control error packet is increased to a designated magnitude, the variation in the voltage (Vrail) when the wireless power receiving device 195 is misaligned may be larger than the variation in the voltage (Vrail) when the wireless power receiving device 195 is aligned. Accordingly, the electronic device 101 may compare the variation in the value (CEP_value) included in the control error packet or the variation in the voltage (Vrail) with a designated value and may determine that the wireless power receiving device 195 is misaligned if the variation exceeds the designated value and determine that the wireless power receiving device 195 is aligned if the variation is the designated value or less.

According to various embodiments, the electronic device 101 may continue dropping the voltage applied to the inverter 315 even when the positive value 613 is included in the control error packet 501 received from the wireless power receiving device 195 while performing the operation of detecting the placement state (e.g., alignment or misalignment) of the wireless power receiving device 195. For example, the electronic device 101 (e.g., the first control circuit 330) may be configured to refrain from the operation of increasing the voltage applied to the inverter 315 even when the value included in the received control error packet 501 is the positive value 613, upon receiving the control error packet 501 identified based on dropping the voltage applied to the inverter 315 (e.g., applying the second voltage 611).

Hereinafter, an example operation of a wireless charging system according to various embodiments is described.

According to various embodiments, the electronic device 101 (e.g., a wireless power transmitting device) may perform an operation (or algorithm) for detecting the placement state (or misalignment) of the wireless power receiving device 195.

For example, the electronic device 101 may stepwise drop (or reduce) the magnitude of the voltage applied to the input terminal 316 of the inverter (e.g., the inverter 315 of FIG. 2B) to the threshold magnitude and identify the CEP value (e.g., a value not less than +1 and not more than +127) included in the control error packet received from the wireless power receiving device 195 while dropping (or reducing) the magnitude of the voltage. The voltage applied to the input terminal 316 of the inverter 315 may be defined as an input voltage. The electronic device 101 may compare the identified CEP value with a designated threshold value (e.g., CEP_threshold) and identify the placement state (e.g., alignment or misalignment) of the wireless power receiving device 195 according to a result of the comparison.

As another example, the electronic device 101 may stepwise drop the input voltage until the CEP value (e.g., a value not less than +1 and not more than +127) included in the control error packet received from the wireless power receiving device 195 reaches a designated threshold value (e.g., CEP_threshold), compare the magnitude of the input voltage with the designated value (e.g., Vrail_@), and identify the placement state (e.g., alignment or misalignment) of the wireless power receiving device 195 according to a result of the comparison. In a state in which the CEP value reaches the threshold value (e.g., CEP_threshold), the applied input voltage may be defined as a threshold voltage (Vrail_@).

Figure 7A:
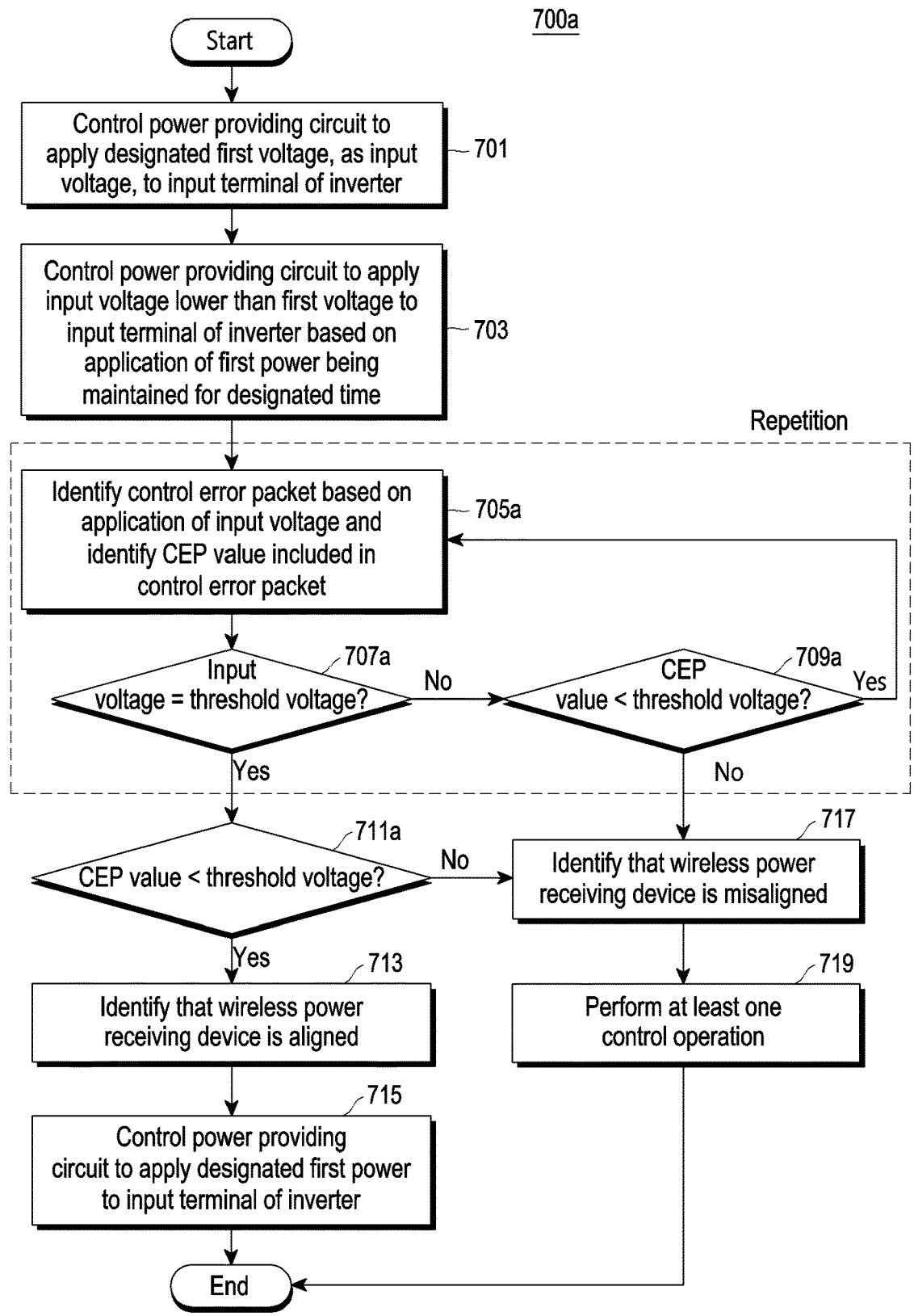
FIG. 7A is a flowchart illustrating an example of an operation of an electronic device according to various embodiments.
Figure 7B:
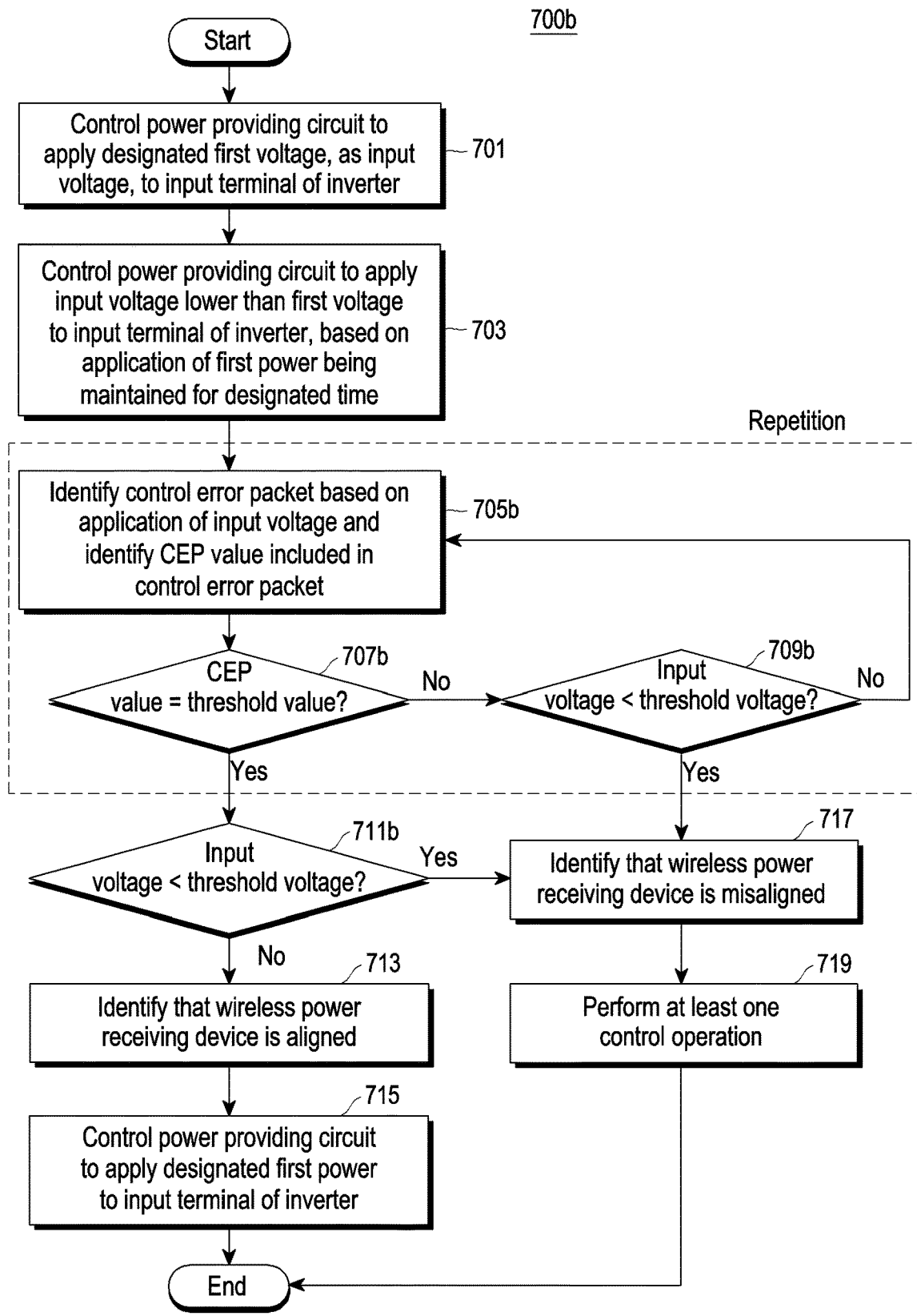
FIG. 7B is a flowchart illustrating an example of an operation of an electronic device according to various embodiments.

FIG. 7A is a flowchart illustrating an example of an operation of an electronic device 101 according to various embodiments. FIG. 7B is a flowchart 700b illustrating another example of an operation of an electronic device 101 according to various embodiments. According to various embodiments, the operations shown in FIGS. 7A and 7B are not limited to the shown order but may rather be performed in other various orders. According to various embodiments, more or less operations than those of FIGS. 7A and 7B may be performed. FIGS. 7A and 7B are described below with reference to FIGS. 8A to 8C.

Figure 8A:
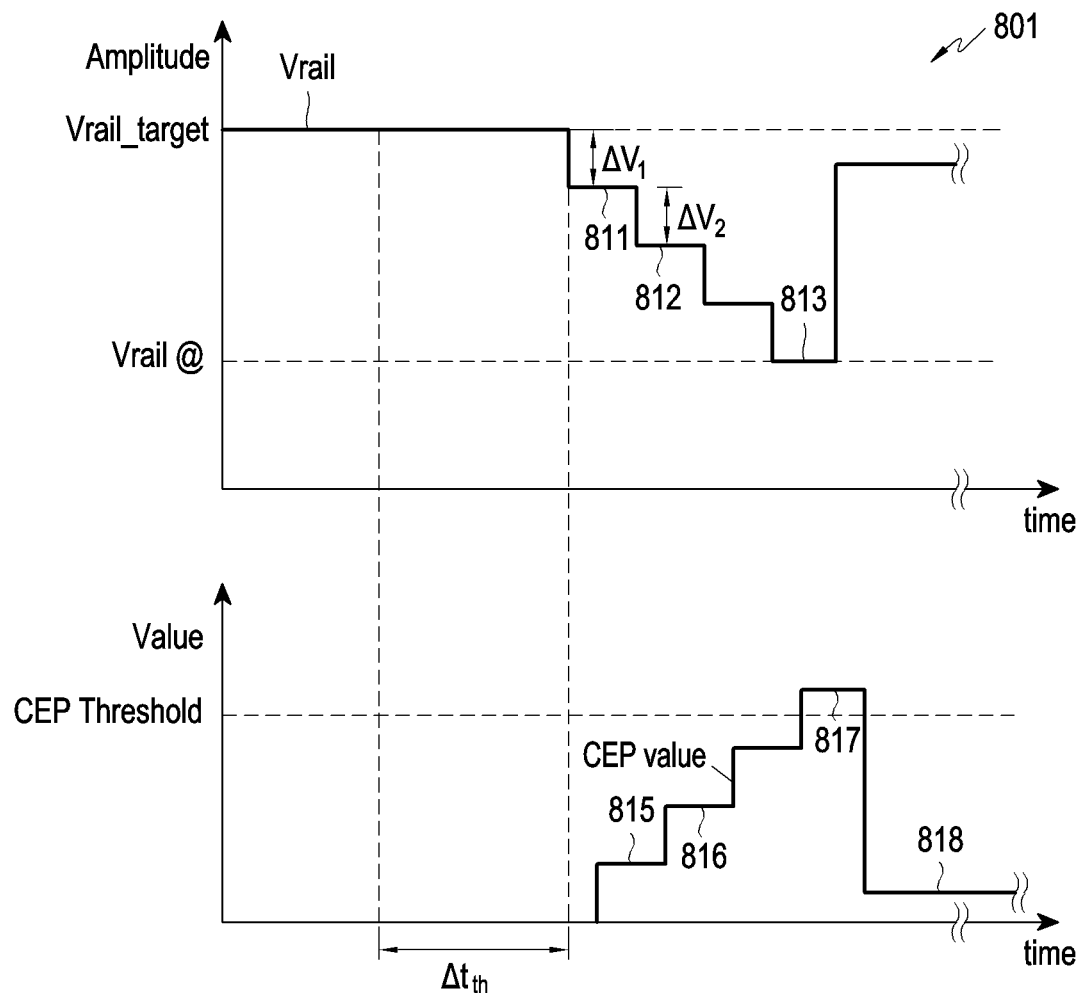
FIG. 8A is a view illustrating an example of an operation of identifying a value of a control error packet and an operation of controlling the magnitude of a driving voltage (e.g., Vrail) of an inverter of an electronic device according to various embodiments.
Figure 8B:
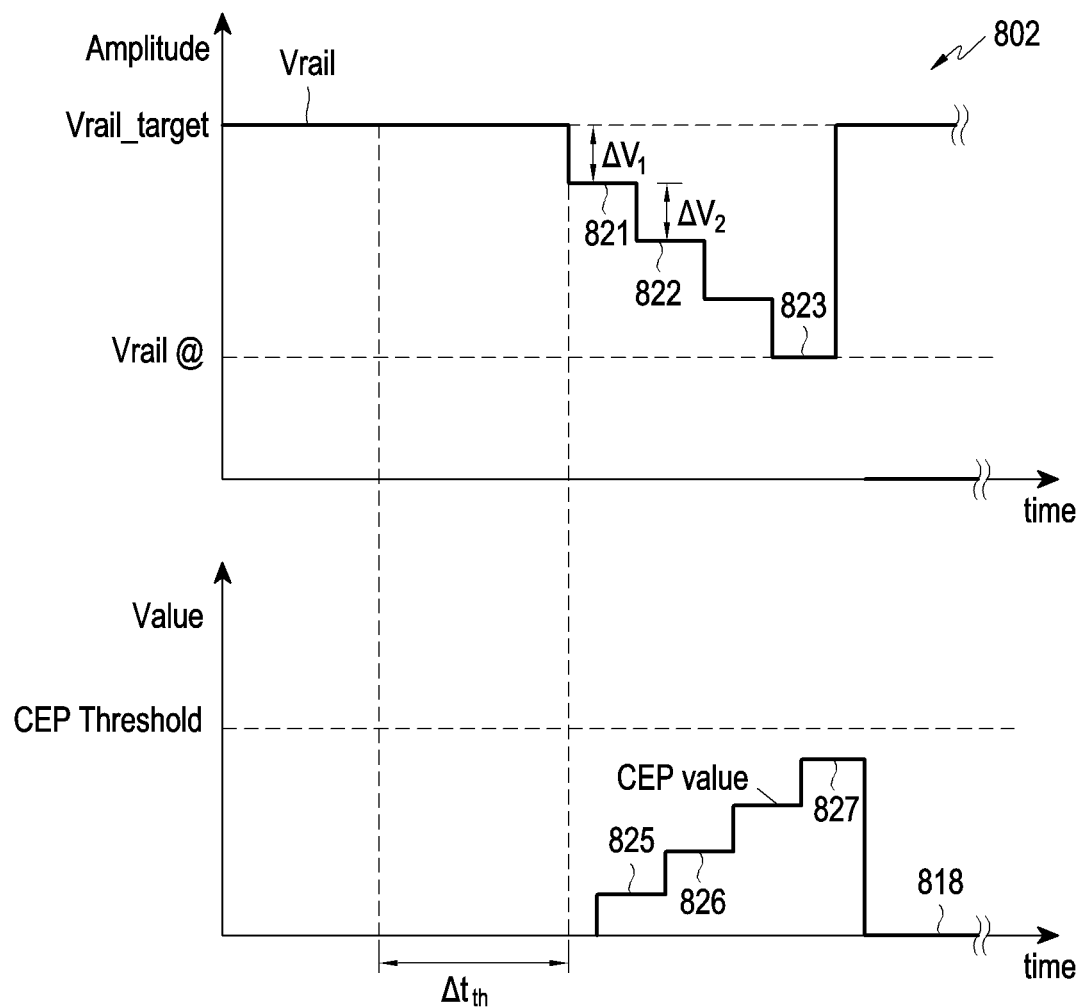
FIG. 8B is a view illustrating another example of an operation of identifying a value of a control error packet and an operation of controlling the magnitude of a driving voltage (e.g., Vrail) of an inverter of an electronic device according to various embodiments.
Figure 8C:
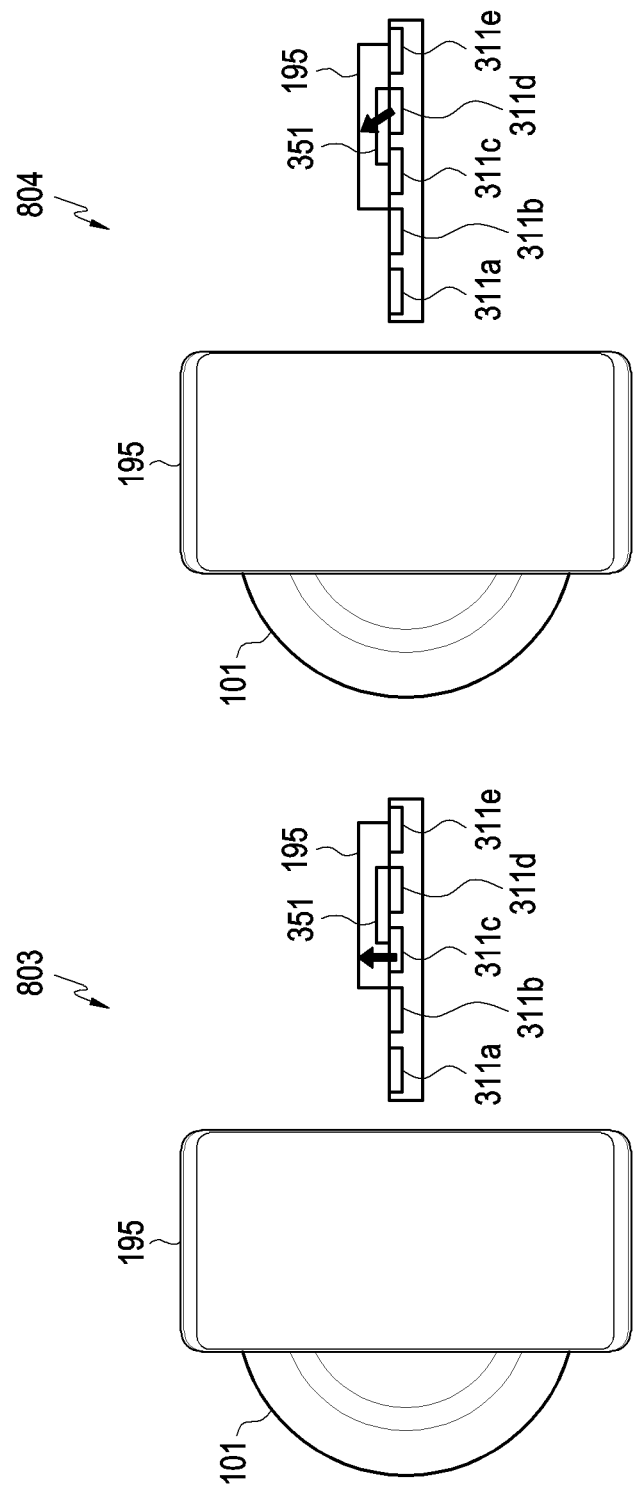
FIG. 8C is a view illustrating an example of an operation of an electronic device including a plurality of subcoils according to various embodiments.

FIG. 8A is a view illustrating an example of an operation of identifying a value of a control error packet and an operation of controlling the magnitude of a driving voltage (e.g., Vrail) of an inverter of an electronic device 101 according to various embodiments. FIG. 8B is a view illustrating another example of an operation of identifying a value of a control error packet and an operation of controlling the magnitude of a driving voltage (e.g., Vrail) of an inverter of an electronic device 101 according to various embodiments. FIG. 8C is a view illustrating an example of an operation of an electronic device 101 including a plurality of subcoils according to various embodiments.

According to various embodiments, in operation 701 of FIGS. 7A and 7B, the electronic device 101 may control the power providing circuit (e.g., the power providing circuit 317 of FIG. 2B) to apply a designated first voltage (e.g., Vrail_target of FIG. 6), as an input voltage, to the input terminal (e.g., the input terminal 316 of FIG. 2B) of the inverter (e.g., the inverter 315 of FIG. 5). For example, upon detecting placement of the wireless power receiving device 195 on the electronic device 101, the electronic device 101 (e.g., the first control circuit 330) may identify the first voltage (Vrail_target), as an input voltage to be applied to the input terminal 316 of the inverter 315, and control the power providing circuit 317 to apply the designated first voltage (Vrail_target), as shown in FIGS. 8A and 8B. Operation 701 of the electronic device 101 may be performed substantially like operation 401 of the electronic device 101 as described above, and no duplicate description thereof is given below.

According to various embodiments, in operation 703 of FIGS. 7A and 7B, the electronic device may control the power providing circuit (e.g., the power providing circuit 317 of FIG. 2B) to apply an input voltage lower than the first voltage to the input terminal (e.g., the input terminal 316 of FIG. 2B) of the inverter (e.g., the first coil 311 of FIG. 2B) based on the application of the first voltage being maintained during a designated time. For example, the electronic device 101 may control the power providing circuit 317 to drop (or reduce) the magnitude of the input voltage applied to the input terminal 316 of the inverter 315 to the second voltage 811 or 821 based on the application of the designated first voltage (Vrail_target) being maintained during a threshold time ($\Delta t_{th}$) as shown in FIGS. 8A and 8B. Operation 703 of the electronic device 101 may be performed substantially like operation 403 of the electronic device 101 as described above, and no duplicate description thereof is given below.

Hereinafter, an example operation for dropping an input voltage applied to the input terminal 316 of the inverter 315 of the electronic device 101 and comparing the CEP value identified according to the drop of the input voltage and a threshold value (CEP_threshold), which is repeated to identify the placement state (e.g., alignment or misalignment) of the wireless power receiving device 195, is described.

According to various embodiments, in operation 705a of FIG. 7A, based on application of an input voltage, the electronic device 101 may identify the control error packet and identify the CEP value included in the control error packet. In operation 707a, the electronic device 101 may identify whether the input voltage 811 or 821 corresponds (or is identical) to the threshold voltage (e.g., Vrail_@). If the input voltage does not correspond to (or is larger than) the threshold voltage, the electronic device 101 may identify whether the CEP value is less than the threshold value to identify whether to drop the input voltage and apply the dropped voltage to the inverter 315 in operation 709a (e.g., reperforming operation 705a). For example, the electronic device 101 may determine the alignment state (e.g., alignment or misalignment) of the wireless power receiving device 195 based on the result of comparison between the CEP value and the threshold value (CEP_threshold). The electronic device 101 may identify the first control error packet corresponding to the second voltage 811 or 821 received from the wireless power receiving device 195 in the in-band scheme while applying the input voltage dropped from the first voltage (Vrail_target) to the second voltage 811 or 821 and identify the CEP value included in the first control error packet. The CEP value may be a positive first value (e.g., a value not less than +1 and not more than +127) 815 or 825. The operation of receiving the control error packet 501 and identifying the value by the electronic device 101 may be performed substantially like operation 405 of the electronic device 101 as described above, and no duplicate description thereof is given below. The electronic device 101 may identify whether the second voltage 811 or 821 which is the dropped input voltage corresponds to (or is greater than) the threshold voltage (Vrail_@). The threshold voltage (Vrail_@) may be a voltage limit (or a lower limit voltage) preset (or pre-stored) to be applied to the input terminal 316 of the inverter 315 for the operation of detecting a misalignment of the wireless power receiving device 195 (or identifying the placement state of the wireless power receiving device 195). The threshold voltage (Vrail_@) may be preset as a value lower than the designated first voltage (Vrail_target). For example, the threshold voltage (Vrail_@) may be set as a voltage applied to the input terminal 316 of the inverter 315 when the efficiency calculated based on a ratio of the value (e.g., PPT) of the power transferred from the electronic device 101 to the wireless power receiving device 195 to the received power value (e.g., the value included in the RPP), in a state in which the wireless power receiving device 195 is aligned on the electronic device 101, corresponds to a designated efficiency (e.g., 70%). When the second voltage 811 or 812 does not correspond to the threshold voltage (Vrail_@) (or when exceeding the threshold voltage (Vrail_@)), the electronic device 101 may compare the first value 815 or 825, which is the identified CEP value, with the stored threshold value (CEP_threshold). The threshold value (CEP_threshold) may be a value stored in the electronic device 101 to detect a misalignment of the wireless power receiving device 195 as described above. No duplicate description is given of the threshold value (CEP_threshold). When the first value 815 or 825 which is the CEP value is less than CEP_threshold, the electronic device 101 may continue dropping the input voltage applied to the input terminal 316 of the inverter 315 (e.g., drop from the second voltage 811 or 812 to the third voltage 812 or 822) and control the power providing circuit 317 to apply the dropped input voltage (the third voltage 812 or 822) to the input terminal 316 of the inverter 315. When the dropped input voltage third voltage 812 or 822 does not correspond to the threshold voltage (Vrail_@), the electronic device 101 may identify the CEP value (e.g., the second voltage 816 or 816) included in the second control error packet identified according to the drop of the input voltage and compare the second voltage 816 or 826 (e.g., a value not less than +1 and not more than +127) which is the identified CEP value with the threshold value (CEP_threshold). When the second value 816 or 826 (e.g., a value not less than +1 and not more than +127) is smaller than the threshold value (CEP_threshold), the electronic device 101 may continue dropping the input voltage applied to the input terminal 316 of the inverter 315 and control the power providing circuit 317 to apply the dropped input voltage to the input terminal 316 of the inverter 315. As such, the electronic device 101 may drop the input voltage until the input voltage applied to the input terminal 316 of the inverter 315 corresponds to (or reaches) the threshold voltage (Vrail_@) and continue identifying the CEP value included in the control error packet identified based on the dropped input voltage and comparing the identified CEP value with the threshold value (CEP_threshold). When the CEP value is smaller than the threshold value according to a result of the comparison between the CEP value and the threshold value (CEP_threshold), operations 705a to 709a of the electronic device 101 may be repeated, and the input voltage (Vrail) may be sequentially dropped from the first voltage to the second voltage 811 or 821, the third voltage 812 or 822, or the fourth voltage 813 or 823, and the CEP value identified accordingly may be sequentially changed to the first value 815 or 825, the second value 816 or 826, and the third value 817 or 827. If the identified CEP value exceeds the threshold value (CEP_threshold) even when the input voltage does not correspond to (or reach) the threshold voltage (Vrail_@) while the input voltage drops, the electronic device 101 may identify that the wireless power receiving device 195 is misaligned (operation 717).

According to various embodiments, the electronic device 101 may stepwise drop the voltage applied to the input terminal 316 of the inverter 315 by designated magnitudes (e.g., ΔV1, ΔV2). In an embodiment, the designated magnitudes (e.g., ΔV1, ΔV2) may correspond (or be identical) to each other. For example, the electronic device 101 may drop the magnitude of the voltage by the corresponding (or identical) magnitudes. According to an embodiment, the designated messages (e.g., ΔV1, ΔV2) may differ from each other. For example, the electronic device 101 may drop the voltage by different magnitudes. For example, the electronic device 101 may set the magnitude of the voltage dropped before a designated number of times of dropping to be larger than the magnitude of the voltage dropped after the designated number of dropping. Thus, the electronic device 101 may quickly drop the magnitude of the voltage before the designated number of times of dropping and, after the designated number of times of dropping, drop the magnitude of the voltage by a smaller degree, thereby more accurately identifying whether the wireless power receiving device 195 is misaligned.

Meanwhile, without being limited thereto, rather than stepwise dropping the input voltage, the electronic device 101 may drop the input voltage to the threshold voltage (Vrail_@) at once and compare the identified CEP value with the threshold value (CEP_threshold) to thereby identify the placement state of the wireless power receiving device 195.

Hereinafter, an example operation for dropping an input voltage applied to the input terminal 316 of the inverter 315 of the electronic device 101 and comparing the input voltage and the threshold voltage (Vrail_@), which is repeated to identify the placement state (e.g., alignment or misalignment) of the wireless power receiving device 195, is described.

According to various embodiments, in operation 705b of FIG. 7B, the electronic device 101 may identify the control error packet 501 based on application of the input voltage and identify the CEP value included in the control error packet 501. In operation 707b, the electronic device 101 may identify whether the CEP value corresponds (or is identical) to the threshold value (CEP_threshold). If the CEP value does not correspond to (or is larger than) the threshold value, the electronic device 101 may identify whether the input voltage is smaller than the threshold voltage (Vrail_@) to identify whether to drop the input voltage and apply the dropped input voltage to the inverter 315 (e.g., reperforming operation 705a) in operation 709b. For example, the electronic device 101 may determine the alignment state (e.g., alignment or misalignment) of the wireless power receiving device 195 based on a result of comparison between the input voltage applied to the input terminal 316 of the inverter 315 and the threshold voltage (Vrail_@). The electronic device 101 may identify the first control error packet corresponding to the second voltage 811 or 821 received from the wireless power receiving device 195 in the in-band scheme while applying the input voltage dropped from the first voltage (Vrail_target) to the second voltage 811 or 821 and identify the CEP value included in the first control error packet. The CEP value may be a positive first value (e.g., a value not less than +1 and not more than +127) 815 or 825. The electronic device 101 may compare the first value, which is the CEP value, with the threshold value (CEP_threshold) and, if the first value is lower than the threshold value (CEP_threshold), identify the input voltage (e.g., the second voltage 811 or 821) and compare the identified second voltage 811 or 821 with the threshold voltage (Vrail_@). When the second voltage 811 or 821 exceeds the threshold voltage (Vrail_@), the electronic device 101 may continue dropping the input voltage applied to the input terminal 316 of the inverter 315 until the CEP value corresponds to (or reaches) the threshold value (e.g., drops the second voltage 811 or 821 to the third voltage 812 or 822) and compare the dropped input voltage with the threshold voltage (Vrail_@). If the identified input voltage is lower than the threshold voltage (Vrail_@) even when the CEP value does not correspond to (or reach) the threshold value (CEP_threshold) while dropping the input voltage, the electronic device 101 may identify that the wireless power receiving device 195 is misaligned (operation 717).

Meanwhile, without being limited thereto, rather than stepwise dropping the input voltage, the electronic device 101 may drop the input voltage at once until the CEP value corresponds to (or reaches) the threshold value (CEP_threshold) and may identify the placement state of the wireless power receiving device 195 according to the value of the identified input voltage. The input voltage applied to the inverter 315 when the CEP value corresponds to (or reaches) the threshold value (CEP_threshold) may be defined as the threshold voltage (Vrail_@).

Described below is an example operation of identifying the placement state of the wireless power receiving device 195 depending on the result of comparison with the CEP value of the electronic device 101 when the input voltage (e.g., the second voltage 811 or 812, the third voltage 812 or 822, and the fourth voltage 813 or 823) applied to the input terminal 316 of the inverter 315 corresponds to the threshold voltage.

According to various embodiments, upon identifying that the input voltage corresponds (or is identical) to the threshold voltage (Vrail_@) in operation 707a of FIG. 7A, the electronic device 101 may identify whether the CEP value is smaller than the threshold value (CEP_threshold) in operation 711a. If the CEP value is smaller than the threshold value (CEP_threshold), the electronic device 101 may identify that the wireless power receiving device 195 is aligned in operation 713. In operation 715, the electronic device 101 may control the power providing circuit to apply the designated first voltage (Vrail_target) to the input terminal of the inverter 315. For example, upon identifying that the CEP value (e.g., the third value (e.g., the third value 827 of FIG. 8B)) included in the control error packet received from the wireless power receiving device 195 is less than the threshold value (CEP_threshold) while applying the fourth voltage 813 or 823 corresponding to the threshold voltage (Vrail_@) according to the input voltage drop to the input terminal 316 of the inverter 315, the electronic device 101 may identify that the wireless power receiving device 195 is aligned. The electronic device 101 may control the power providing circuit 317 to reapply the designated first voltage (Vrail_target) to the input terminal 316 of the inverter 315 based on identifying that the wireless power receiving device 195 is aligned. Meanwhile, the first voltage (Vrail_target) is merely an example, and the magnitude of the voltage applied to the inverter after the wireless power receiving device 195 is identified as aligned is not limited. Meanwhile, when the value (e.g., the third value (e.g., the third value 817 of FIG. 8A)) included in the control error packet is the threshold value (CEP_threshold) or more while applying the fourth voltage 813 or 823 corresponding to the threshold voltage (Vrail_@) according to the voltage drop to the inverter 315, the electronic device 101 may identify that the wireless power receiving device 195 is misaligned. An example operation of the electronic device 101 when the wireless power receiving device 195 is identified as misaligned is described below in connection with operations 717 to 719.

Described below is an example operation of identifying the placement state of the wireless power receiving device 195 depending on a result of comparison between a threshold voltage and an input voltage of the electronic device 101 when a CEP value (e.g., the first value 815 or 825, the second value 816 or 826, the third value 817 or 837) corresponds to (or exceeds) a threshold value (CEP_threshold). According to various embodiments, upon identifying that the CEP value corresponds (or is identical) to the threshold value (CEP_threshold) in operation 707b of FIG. 7B, the electronic device 101 may identify whether the input voltage is smaller than the threshold voltage (Vrail_@) in operation 711b. If the input voltage exceeds the threshold voltage (Vrail_@), the electronic device 101 may identify that the wireless power receiving device 195 is aligned in operation 713 and, in operation 715, control the power providing circuit to apply the designated first voltage (Vrail_target) to the input terminal of the inverter 315. For example, if the CEP value (e.g., the third value) included in the control error packet received from the wireless power receiving device 195 according to the input voltage drop corresponds to (or exceeds) the threshold value (CEP_threshold), the electronic device 101 may identify the input voltage applied to the inverter 315 and, when the input voltage exceeds the threshold voltage (Vrail_@), identify that the wireless power receiving device 195 is aligned. The electronic device 101 may control the power providing circuit 317 to reapply the designated first voltage (Vrail_target) to the input terminal 316 of the inverter 315 based on identifying that the wireless power receiving device 195 is aligned. Meanwhile, when the CEP value (e.g., the third value) included in the control error packet received from the wireless power receiving device 195 corresponds to (or exceeds) the threshold value (CEP_threshold), the electronic device 101 may identify the input voltage applied to the inverter 315, and when the input voltage is lower than the threshold voltage (Vrail_@ v), identify that the wireless power receiving device 195 is misaligned. An example operation of the electronic device 101 when the wireless power receiving device 195 is identified as misaligned is described below in connection with operations 717 to 719.

Examples of an operation of identifying that the wireless power receiving device 195 is misaligned by the electronic device 101 are described below.

According to various embodiments, upon identifying that the CEP value is larger than the threshold value (CEP_threshold) in operation 711a of FIG. 7A or upon identifying that the input voltage is smaller than the threshold voltage (Vrail_@) in operation 711b of FIG. 7B, the electronic device 101 may identify a misalignment of the wireless power receiving device 195 in operation 717 of FIGS. 7A and 7B and, in operation 719, perform at least one control operation based on identifying the misalignment. For example, when it is identified that the value (e.g., the first value 815 or 816 or the second value 816 or 826) included in the control error packet (e.g., the first control error packet or the second control error packet) received from the wireless power receiving device 195 is not less than the threshold value (e.g., CEP_threshold) or when the voltage reaches the threshold voltage 813 while stepwise dropping the voltage, the electronic device 101 may identify that the value (e.g., the third value (e.g., the third value 817 of FIG. 8A)) included in the control error packet received from the wireless power receiving device 195 is the threshold value (CEP_threshold) or more. When the value (e.g., the first value 815 or 816, the second value 816 or 826, or the third value (e.g., the third value 817 of FIG. 8A)) of the required power amount included in the control error packet is larger than the threshold value (e.g., CEP_threshold), the electronic device 101 may identify that the wireless power receiving device 195 is misaligned. For example, in the misaligned state, the value (CEP value) (or the required power amount included in the control error packet) included in the control error packet transferred from the wireless power receiving device 195 may be larger than in the normal state (e.g., in the state where the wireless power receiving device 195 is aligned). By using this, as described above, the electronic device 101 may identify the placement state (e.g., alignment or misalignment) of the wireless power receiving device 195 by comparing the value included in the control error packet and a preset threshold value (CEP_threshold) for determining a misalignment. As another example, when the voltage value (Vrail) applied to the input terminal 316 of the inverter identified while stepwise increasing the value included in the control error packet until the threshold value (CEP_threshold) is exceeded (or identical or more) is less than the threshold voltage (Vrail_@), the electronic device 101 may identify that the wireless power receiving device 195 is misaligned.

According to various embodiments, when the variation in the identified value (CEP value) or the variation in voltage (e.g., Vrail), rather than the identified value (CEP value) or voltage (e.g., Vrail), exceeds a designated value, the electronic device 101 may also identify that the wireless power receiving device 195 is misaligned. For example, as described above, in a case where the voltage (Vrail) drops to a designated magnitude, the variation in the positive value included in the control error packet 501 when the wireless power receiving device 195 is misaligned may be larger than the variation in the positive value included in the control error packet when the wireless power receiving device 195 is aligned. As another example, in a case where the value (CEP_value) included in the control error packet is increased to a designated magnitude, the variation in the voltage (Vrail) when the wireless power receiving device 195 is misaligned may be larger than the variation in the voltage (Vrail) when the wireless power receiving device 195 is aligned. The electronic device 101 may compare the variation in the value (CEP_value) included in the control error packet or the variation in the voltage (Vrail) with a designated value and may determine that the wireless power receiving device 195 is misaligned if the variation exceeds the designated value and determine that the wireless power receiving device 195 is aligned if the variation is the designated value or less.

According to various embodiments, the electronic device 101 may perform at least one control operation based on identifying that the wireless power receiving device 195 is misaligned. For example, the at least one control operation may include at least one of an operation for controlling the power providing circuit 317 to apply a voltage lower than the designated first voltage (Vrail_target) to the input terminal 316 of the inverter 315, an operation for discharging heat by driving a fan (not shown) included in the electronic device 101, or an operation for controlling (e.g., reducing) the amount of current transferred to the first coil 311. It is possible to address the heat generation issue by performing at least one control operation as described above. As another example, as illustrated in 803 and 804 of FIG. 8C, the electronic device 101 may switch the subcoil selected to transmit power from one subcoil (e.g., the third subcoil 311c) to another subcoil (e.g., the fourth subcoil 311d) and transmit power to the wireless power receiving device 195. In this case, the electronic device 101 may perform the above-described operations 705 to 719 using the reselected subcoil (e.g., the fourth subcoil 311d). It is possible to enhance the charging efficiency for the wireless power receiving device 195 by transmitting power to the wireless power receiving device 195 with the optimal subcoil. As another example, the electronic device 101 may maintain the application of the voltage lower than the first voltage (Vrail_target) until the wireless power receiving device 195 is fully charged. In this case, in the case of applying the voltage lower than the first voltage (Vrail_target) as shown in FIG. 8A, the electronic device 101 may identify the control error packet received from the wireless power receiving device 195 and identify the positive value 818 included in the identified control error packet. For example, when the placement state is determined as a misaligned state, the electronic device 101 may reduce the amount of transmitted power and, accordingly, the wireless power receiving device 195 may include the positive value 818, which is the required power amount, in the CEP and transfer it to the electronic device 101. Based on identifying that the wireless power receiving device 195 is misaligned, the electronic device 101 may refrain from increasing the voltage and maintaining the application of the voltage lower than the first voltage (Vrail_target) even when the positive value 818 which is the required power amount in the CEP is identified. Without being limited thereto, the electronic device 101 may transmit information for displaying the misalignment of the wireless power receiving device 195 on the display (not shown) of the wireless power receiving device 195 to the wireless power receiving device 195, so that the wireless power receiving device 195 may display the information on the display of the wireless power receiving device 195 based on the information.

Hereinafter, an example operation of a wireless charging system according to various embodiments is described.

According to various embodiments, the electronic device 101 (e.g., a wireless power transmitting device) may perform an operation (or algorithm) for detecting the placement state (or misalignment) of the wireless power receiving device 195 based on identifying an occurrence of a designated event.

Figure 9:
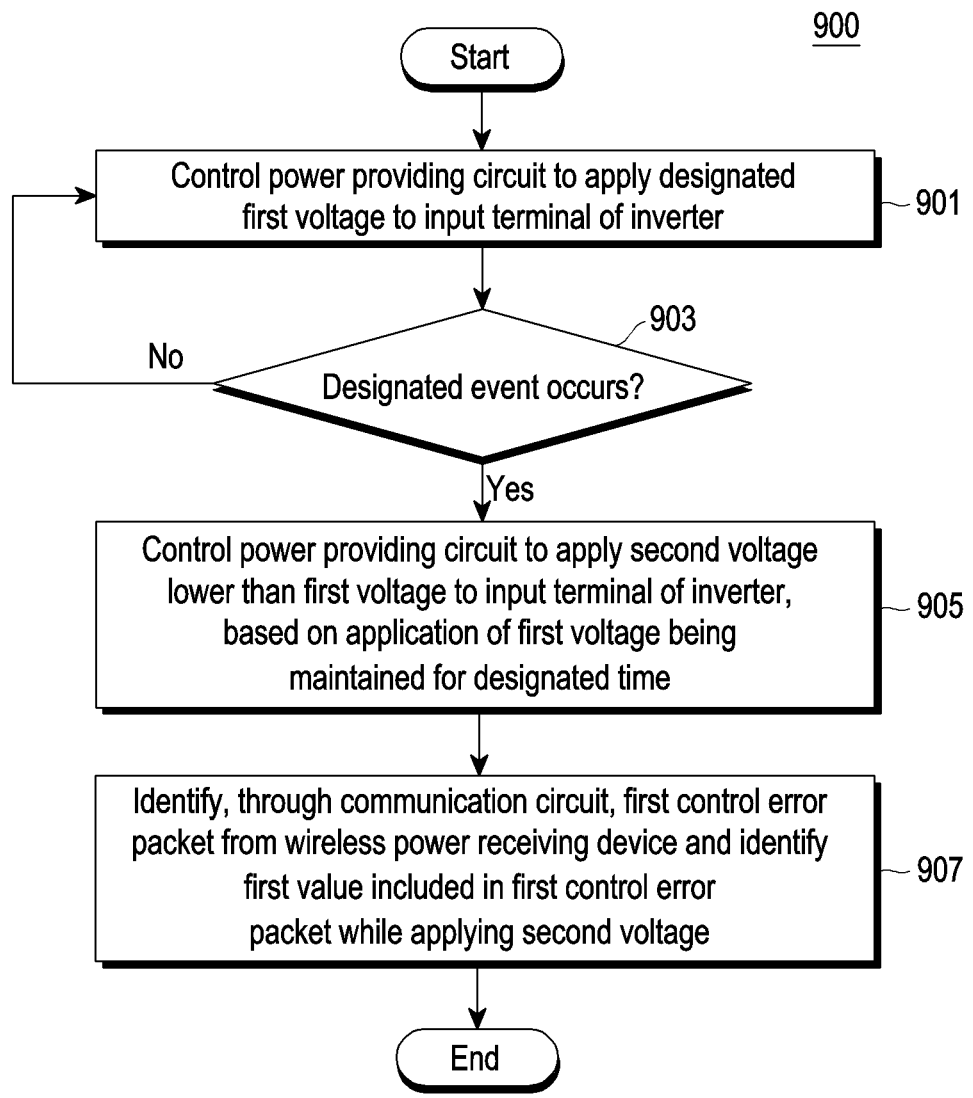
FIG. 9 is a flowchart illustrating an example of an operation of an electronic device according to various embodiments.

FIG. 9 is a flowchart illustrating an example of an operation of an electronic device 101 according to various embodiments. According to various embodiments, the operations shown in FIG. 9 are not limited to the shown order but may rather be performed in other various orders. According to various embodiments, more or less operations than those of FIG. 9 may be performed. FIG. 9 is described below with reference to FIGS. 10 and 11.

Figure 10:
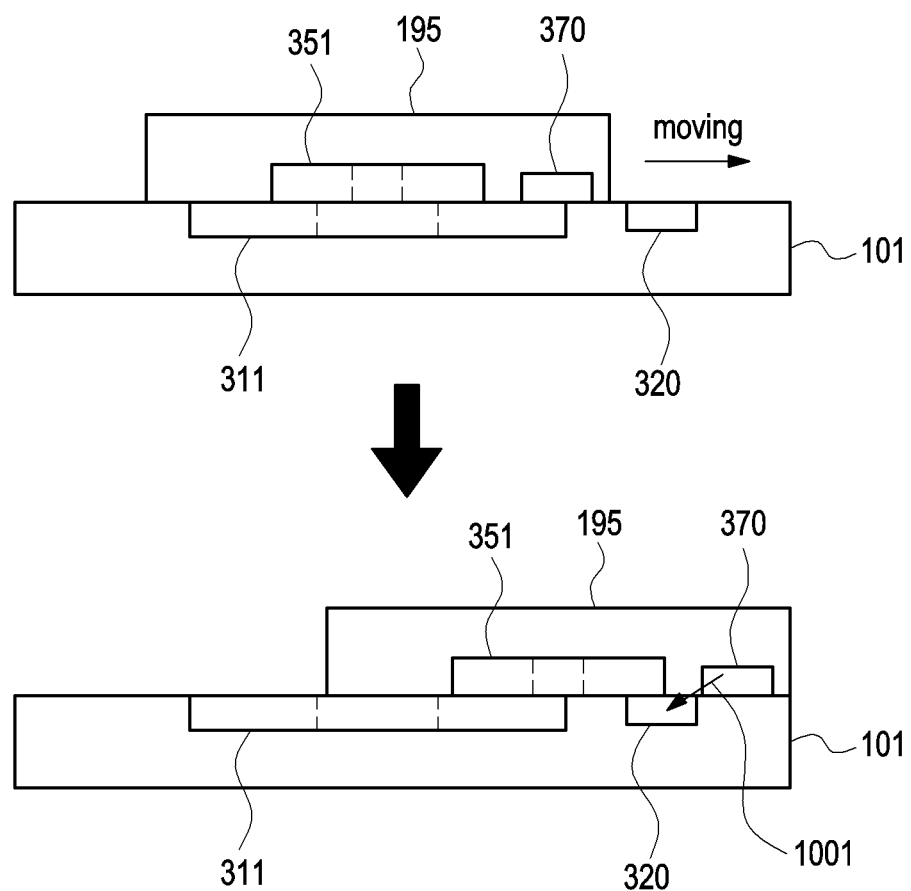
FIG. 10 is a view illustrating an example of an operation of identifying an occurrence of a designated event of an electronic device (e.g., receiving a signal from a wireless power receiving device) according to various embodiments.
Figure 11:
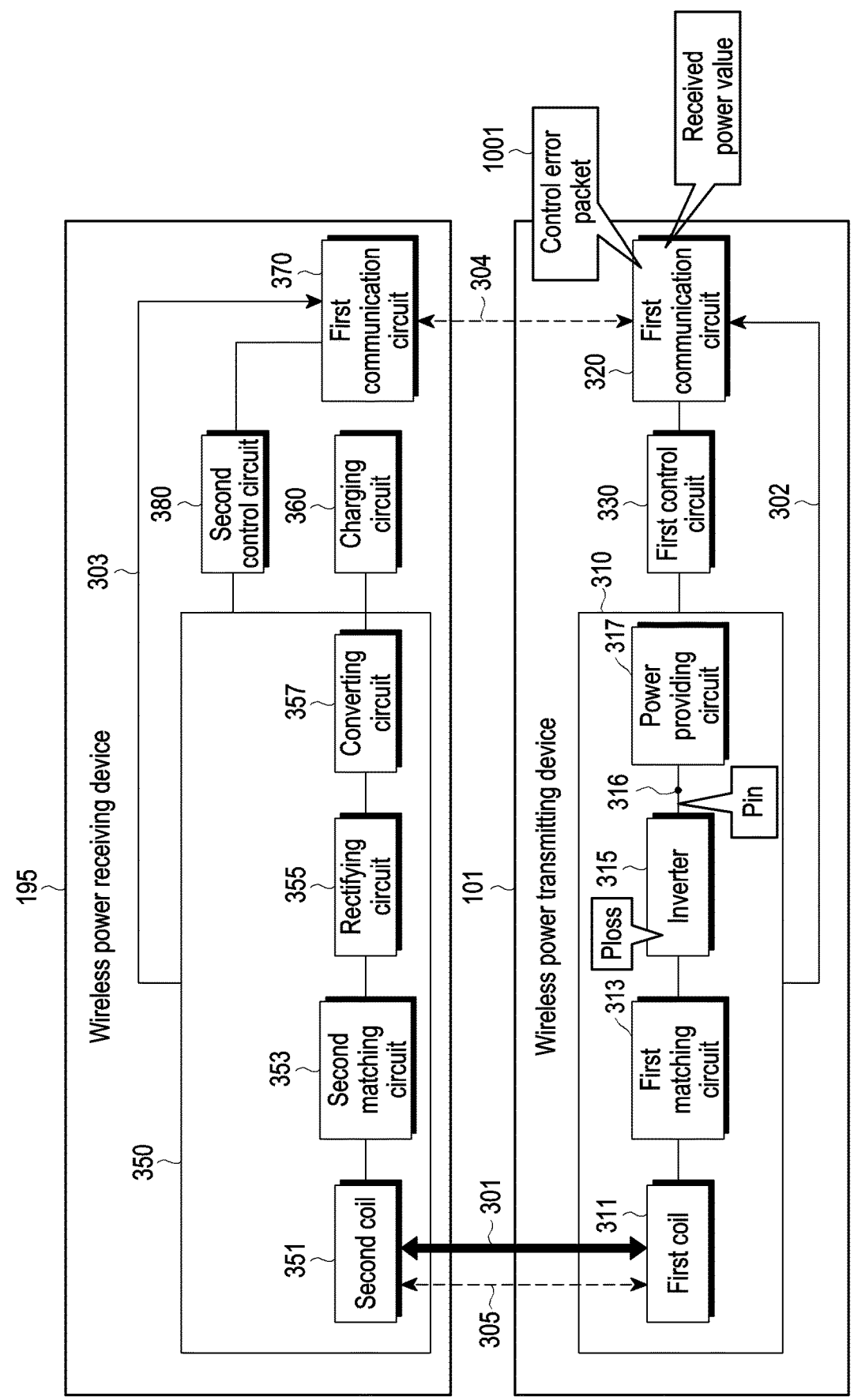
FIG. 11 is a view illustrating a configuration of an electronic device performing an operation of detecting a placement state (or misalignment) of a wireless power receiving device according to various embodiments.

FIG. 10 is a view illustrating an example of an operation of identifying an occurrence of a designated event of an electronic device 101 (e.g., receiving a signal from a wireless power receiving device 195) according to various embodiments. FIG. 11 is a view illustrating a configuration of an electronic device 101 performing an operation of detecting a placement state (or misalignment) of a wireless power receiving device 195 according to various embodiments.

According to various embodiments, in operation 901, the electronic device 101 may control the power providing circuit (e.g., the power providing circuit 317 of FIG. 11) to apply a designated first voltage to the input terminal (e.g., the input terminal 316 of FIG. 11) of the inverter (e.g., the inverter 315 of FIG. 11). For example, the electronic device 101 (e.g., the first control circuit 330) may control the power providing circuit 317 to apply the designated first voltage (e.g., Vrail_target) to the input terminal (e.g., the input terminal 316 of FIG. 11) of the inverter (e.g., the inverter 315 of FIG. 11) when it is detected that the wireless power receiving device 195 is placed on the electronic device 101. Operation 901 of the electronic device 101 may be performed in substantially the same manner as operation 401 of the electronic device 101 as described above, and no duplicate description thereof is given below.

According to various embodiments, in operation 903, the electronic device 101 may identify an occurrence of a designated event. The designated event may be an event configured to trigger (or initiate) the operation of detecting the placement state (e.g., alignment or misalignment) of the wireless power receiving device 195 (or the operation of dropping the first voltage (Vrail_target)) by the electronic device 101. For example, the designated event may include identifying a change in the charging efficiency by a designated value or more. For example, the electronic device 101 may periodically identify the packet (e.g., received power packet (RPP)) including the received power value (PPR) received from the wireless power receiving device 195 in the in-band scheme while applying the first voltage (Vrail_target) to the input terminal 316 of the inverter 315 and identify the received power value included in the packet. As shown in FIG. 11, the electronic device 101 may identify the input power Pin and power loss Ploss and identify the transmitted power value (PPT) based on the identified input power and power loss. Meanwhile, the power loss is not limited to that shown in FIG. 11 and may also be caused by other components (e.g., a capacitor or metals) in the electronic device 101. The electronic device 101 may periodically identify the charging efficiency based on a ratio of the identified received power value and the transmitted power value. The electronic device 101 may calculate the variation in charging efficiency and, if the variation in charging efficiency is a designated value or more, identify that the designated event occurs. As another example, the designated event may include receiving designated information from the wireless power receiving device 195. Upon identifying a packet indicating that the wireless power receiving device 195 has moved, received from the wireless power receiving device 195 while applying the first voltage (Vrail_target) to the input terminal 316 of the inverter 315 (e.g., identifying movement information 1001), the electronic device 101 may identify that the designated event occurs. The wireless power receiving device 195 may detect a movement of the wireless power receiving device 195 using a sensor (e.g., an acceleration sensor) as shown in FIG. 10 and, in response to the detection of the movement, transmit a packet indicating that the wireless power receiving device 195 has moved to the electronic device 101 in the in-band scheme.

According to various embodiments, based on identifying that the designated event occurs, in operation 905, the electronic device may control the power providing circuit (e.g., the power providing circuit 317 of FIG. 11) to apply a second voltage lower than the first voltage to the input terminal (e.g., the input terminal 316 of FIG. 11) of the inverter (e.g., the inverter 315 of FIG. 11) based on the application of the first voltage being maintained during a designated time. For example, the electronic device 101 may control the power providing circuit 317 to drop (or reduce) the magnitude of the voltage applied to the input terminal 316 of the inverter 315 based on the application of the first voltage (e.g., Vrail_target) being maintained during a threshold time. Operation 905 of the electronic device 101 may be performed substantially like operation 403 or operation 703 of the electronic device 101 as described above, and no duplicate description thereof is given below.

According to various embodiments, in operation 907, while applying the second voltage, the electronic device 101 may identify, through the communication circuit (e.g., the first communication circuit 320), the first control error packet from the wireless power receiving device 195 and may identify the first value included in the first control error packet. Operation 907 of the electronic device 101 may be performed in substantially the same manner as operations 405 to 407 and 705 to 717 of the electronic device 101 as described above, and no duplicate description thereof is given below.

Hereinafter, an example operation of a wireless charging system according to various embodiments is described.

According to various embodiments, the electronic device 101 (e.g., a wireless power transmitting device) may compare a threshold value corresponding to information (e.g., identification information or power information) associated with the wireless power receiving device 195 with the value included in the above-described control error packet while performing the operation of identifying the placement state of the wireless power receiving device 195. For example, the electronic device 101 may set a different threshold value for each type of wireless power receiving device 195.

Figure 12:
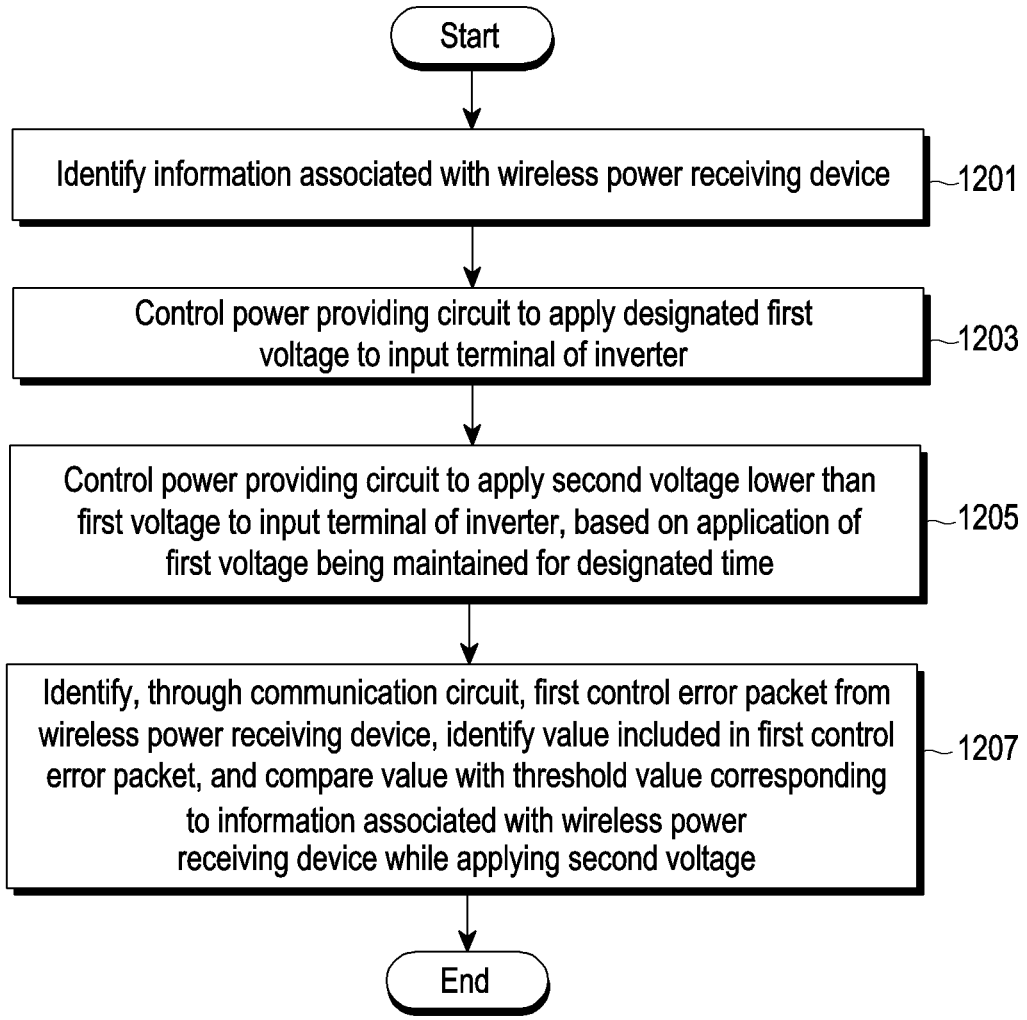
FIG. 12 is a flowchart illustrating an example of an operation of an electronic device according to various embodiments.

FIG. 12 is a flowchart illustrating an example of an operation of an electronic device 101 according to various embodiments. According to various embodiments, the operations shown in FIG. 12 are not limited to the shown order but may rather be performed in other various orders. According to various embodiments, more or less operations than those of FIG. 9 may be performed. FIG. 12 is described below with reference to FIGS. 13 and 14.

Figure 13:
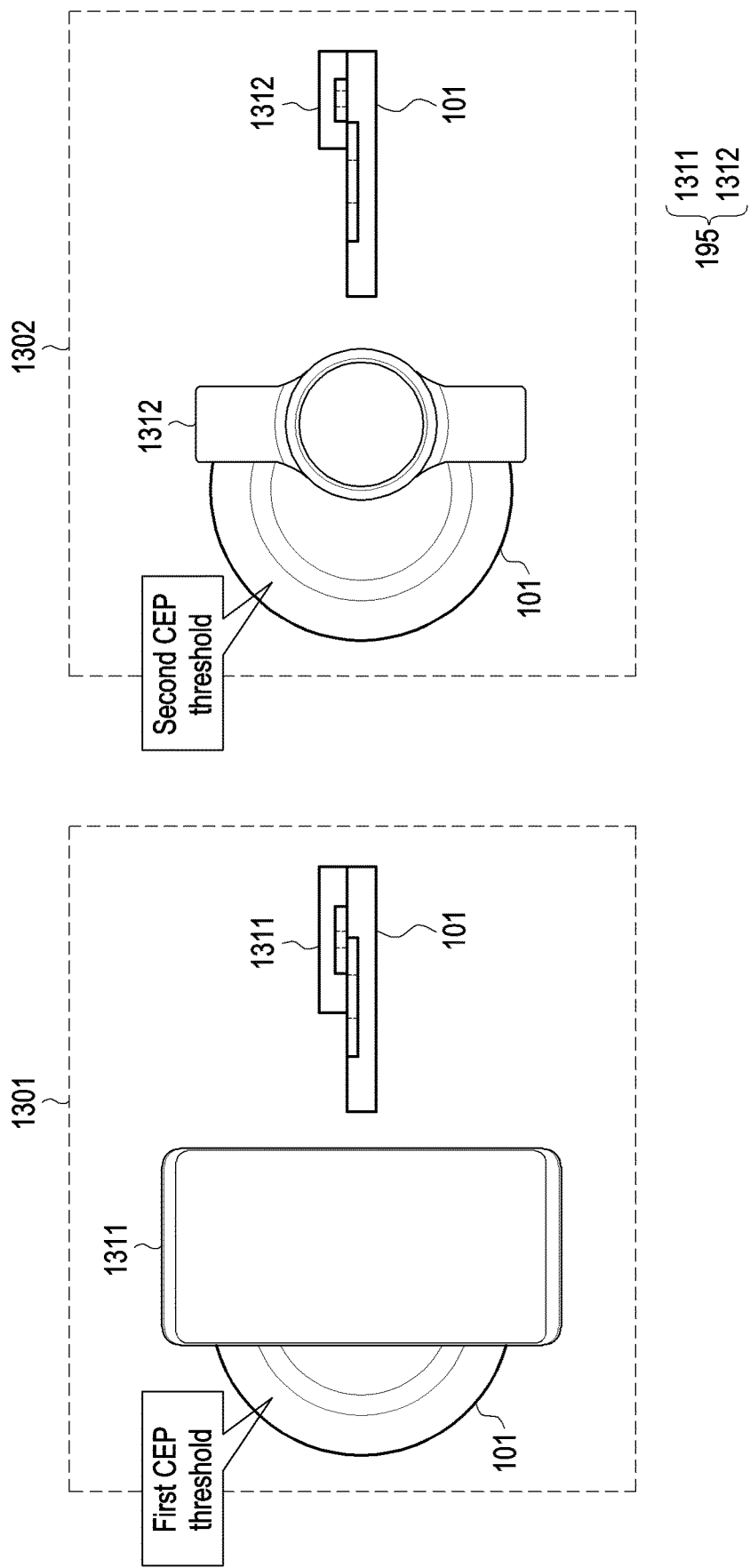
FIG. 13 is a view illustrating an example of a charging operation of an electronic device depending on the type of a wireless power receiving device according to various embodiments.
Figure 14:
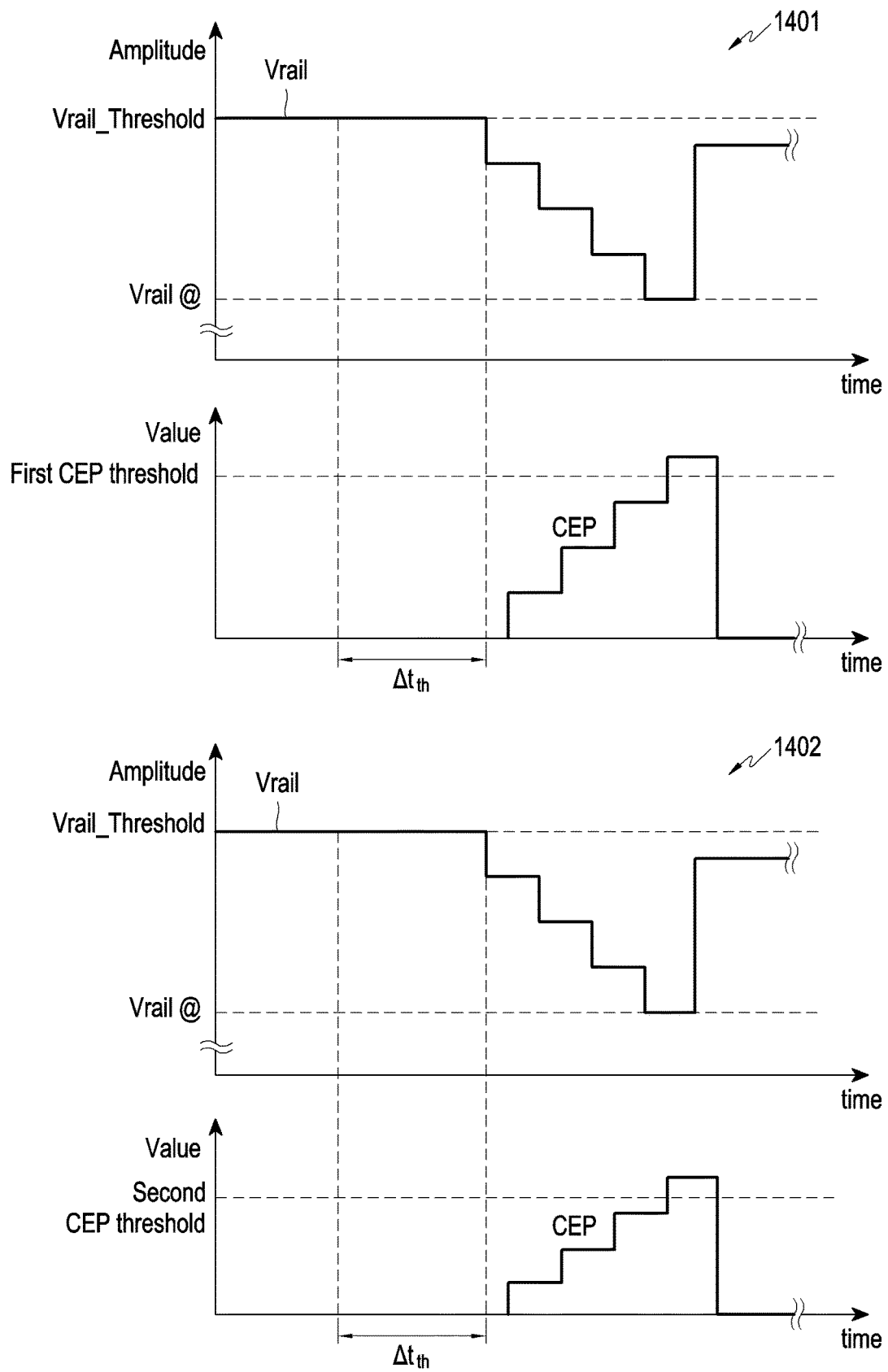
FIG. 14 is a view illustrating an example of an operation of identifying a value of a control error packet and an operation of controlling the magnitude of a driving voltage (e.g., Vrail) of an inverter of an electronic device according to various embodiments.

FIG. 13 is a view illustrating an example of a charging operation of an electronic device 101 depending on the type of a wireless power receiving device 195 according to various embodiments. FIG. 14 is a view illustrating an example of an operation of identifying a value of a control error packet and an operation of controlling the magnitude of a driving voltage (e.g., Vrail) of an inverter 315 of an electronic device 101 according to various embodiments.

According to various embodiments, in operation 1201, the electronic device 101 may identify information associated with the wireless power receiving device 195. For example, the information associated with the wireless power receiving device 195 may include identification information for the wireless power receiving device or information about the power (or voltage) (e.g., maximally outtable from the rectifier) associated with the wireless power receiving device 195. An operation for identifRing identification information for the wireless power receiving device 195 and information about the power (or voltage) of the wireless power receiving device 195 by the electronic device 101 is described below.

First, an operation for identifying identification information for the wireless power receiving device 195 by the electronic device 101 is described.

According to various embodiments, the electronic device 101 may identify the type of the wireless power receiving device based on the packet or information received from the wireless power receiving device 195. For example, when the wireless power receiving device 195 is placed on the electronic device 101, the electronic device 101 may complete a ping phase (e.g., a ping phase according to the Qi standard) with the wireless power receiving device 195 and enter an identification phase and configuration phase (e.g., an identification data phase & configuration phase according to the Qi standard). According to an embodiment, the electronic device 101 may identify the identification packet (e.g., an identification data packet or extended identification data packet according to the Qi standard) received from the wireless power receiving device 195, in the in-band scheme, in the identification phase and the configuration phase and may identify identification information, such as at least one of the manufacturer code, device identifier, or device type included in the identification packet. For example, the electronic device 101 may identify different types (e.g., the terminal 1311 or the wearable 1312) of wireless power receiving devices 195 as shown in 1301 and 1302 of FIG. 13, based on identifying the identification information. Further, without being limited thereto, the electronic device 101 may receive identification information, such as at least one of the above-described manufacturer code, device identifier, or device type, from the wireless power receiving device 195 in the out-band scheme.

An operation for identifying information about the power (or voltage) associated with the wireless power receiving device 195 by the electronic device 101 is described below.

According to various embodiments, the electronic device 101 may identify information about the power associated with the wireless power receiving device 195 based on the packet or information received from the wireless power receiving device 195. For example, the electronic device 101 may identify the signal strength value included in the signal strength packet (e.g., a signal strength packet according to the Qi standard) received in the ping phase. As another example, the electronic device 101 may identify the power value (e.g., maximum power value) included in the configuration packet (e.g., a configuration packet according to the Qi standard) received in the identification phase and the configuration phase.

According to various embodiments, the electronic device 101 may receive information about a threshold value (CEP_threshold) of the wireless power receiving device 195 from the wireless power receiving device 195 in the configuration phase.

According to various embodiments, the electronic device 101 may store information about the threshold value (CEP_threshold) corresponding to the identification information received from the wireless power receiving device 195 in the memory.

According to various embodiments, in operation 1203, the electronic device 101 may control the power providing circuit (e.g., the power providing circuit 317 of FIG. 2B) to apply a designated first voltage to the input terminal (e.g., the input terminal 316 of FIG. 2B) of the inverter (e.g., the inverter 315 of FIG. 2B). For example, the electronic device 101 (e.g., the first control circuit 330) may control the power providing circuit 317 to apply the designated first voltage (e.g., Vrail_target) to the input terminal (e.g., the input terminal 316 of FIG. 2B) of the inverter 315 when it is detected that the wireless power receiving device 195 is placed on the electronic device 101. Operation 901 of the electronic device 101 may be performed in substantially the same manner as operation 401 of the electronic device 101 as described above, and no duplicate description thereof is given below.

According to various embodiments, in operation 1205, the electronic device may control the power providing circuit (e.g., the power providing circuit 317 of FIG. 2B) to apply a second voltage lower than the first voltage to the input terminal (e.g., the input terminal 316 of FIG. 2B) of the inverter (e.g., the inverter 315 of FIG. 2B) based on the application of the first voltage being maintained during a designated time. For example, the electronic device 101 may control the power providing circuit 317 to drop (or reduce) the magnitude of the voltage applied to the input terminal 316 of the inverter 315 based on the application of the first voltage (e.g., Vrail_target) being maintained during a threshold time ($\Delta t_{th}$). Operation 1205 of the electronic device 101 may be performed substantially like operation 403 or operation 703 of the electronic device 101 as described above, and no duplicate description thereof is given below.

According to various embodiments, in operation 1207, while applying the second voltage, the electronic device 101 may identify, through the communication circuit (e.g., the first communication circuit 320), the first control error packet from the wireless power receiving device 195, identify the value included in the first control error packet, and compare the value with a threshold value (e.g., a first CEP threshold or a second CEP threshold) corresponding to the information associated with the wireless power receiving device 195. For example, referring to 1301 and 1302 of FIG. 13, since the charging efficiency or required charging power differs for each of wireless power receiving devices 1311 and 1312 having different areas, which are placed on the electronic device 101, different threshold values (CEP threshold) may be set to detect a misalignment of the wireless power receiving devices 1311 and 1312. As shown in FIGS. 1401 and 1402 of FIG. 14, the electronic device 101 may compare the threshold value (e.g., the first CEP threshold or the second CEP threshold) corresponding to each of the wireless power receiving devices 1311 and 1312 with the value included in the first control error packet and perform the operation of identifying the placement state (e.g., alignment or misalignment) of the wireless power receiving devices 1311 and 1312. The operation of identifying the value included in the first control error packet and comparing the identified value with the threshold value (CEP threshold) by the electronic device 101 may be performed in substantially the same manner as operations 405 to 407 or 705 to 717, and no duplicate description thereof is given. An example operation for setting a threshold value for the electronic device 101 is further described below.

For example, the electronic device 101 may store information about a plurality of different threshold values (e.g., the first CEP threshold or the second CEP threshold) for information (e.g., identification information (or type) or power information) associated with the wireless power receiving device 195. The electronic device 101 may identify the threshold value corresponding to the information associated with the wireless power receiving device 1311 or 1312 among the plurality of threshold values (e.g., the first CEP threshold or the second CEP threshold) and compare the threshold value (e.g., the first CEP threshold or the second CEP threshold) with the value included in the control error packet.

As another example, the electronic device 101 may adjust the stored threshold value (CEP threshold) based on the information associated with the wireless power receiving device 1311 or 1312. As an example, the electronic device 101 may identify the power information (e.g., signal strength value or power value) corresponding to the identification information for the wireless power receiving device 1311 or 1312 or may correct the stored threshold value (CEP threshold) based on the power information (e.g., signal strength value or power value) identified in the ping phase or the identification and configuration phase. The electronic device 101 may identify a difference between a first value (e.g., signal strength value or power value) of the power information corresponding to the stored threshold value (CEP threshold) and a second value (e.g., signal strength value or power value) of the power information corresponding to the currently placed wireless power receiving device 1311 or 1312 and increase or decrease the threshold value (CEP threshold) in proportion to the difference. As an example, when the second value of the power information corresponding to the placed wireless power receiving device 1311 or 1312 is larger than the first value of the power information, the electronic device 101 may increase the threshold value (CEP threshold) and, when the second value is smaller than the first value, decrease the threshold value (CEP threshold).

As another example, without being limited thereto, the electronic device 101 may set a threshold value (CEP_threshold) based on information about the threshold value (CEP_threshold) of the wireless power receiving device from the wireless power receiving device in the ping phase.

An electronic device 1501 that may be implemented as the electronic device 101 and/or the wireless power receiving device 195 is described below according to various embodiments.

Figure 15:
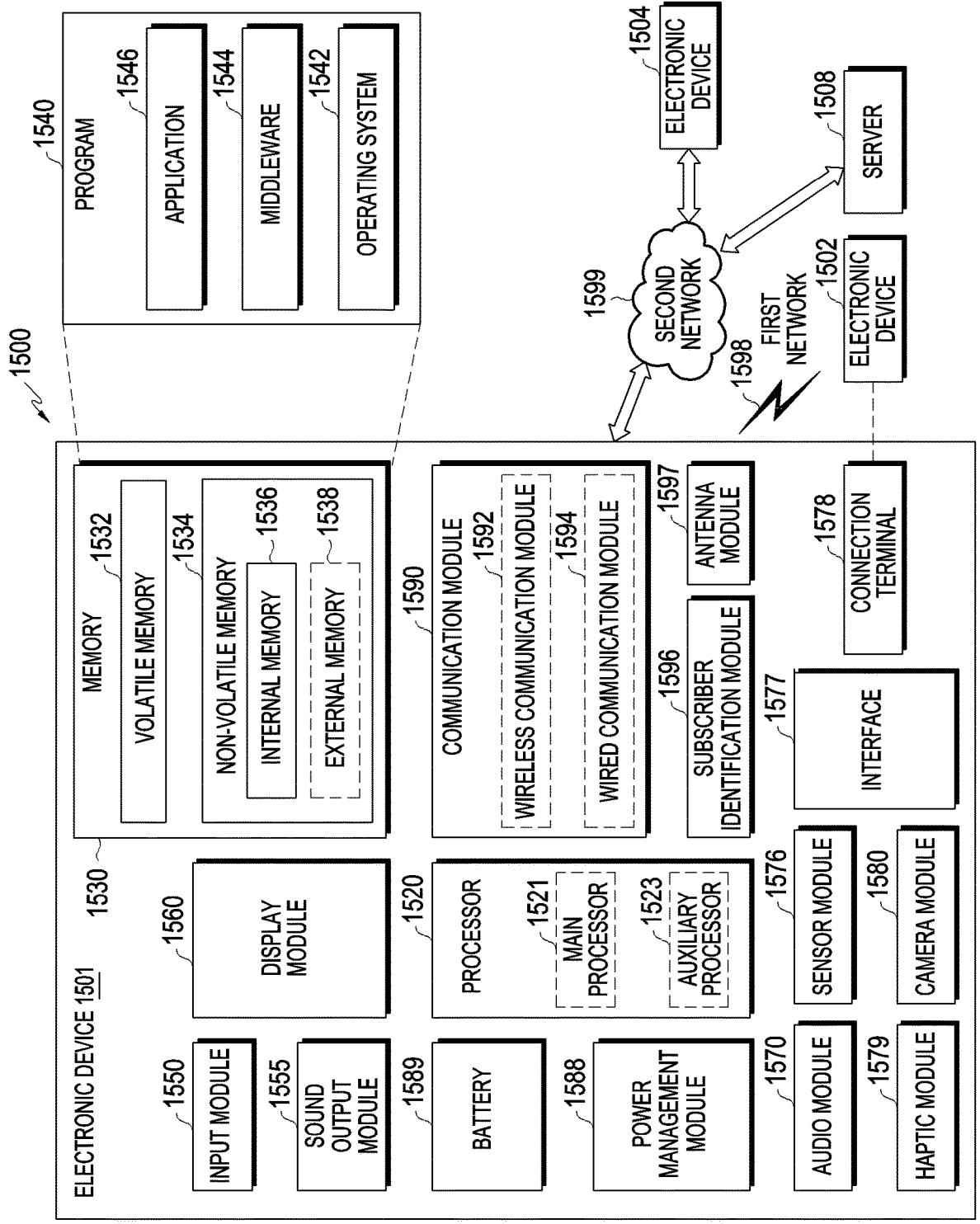
FIG. 15 is a block diagram illustrating an electronic device in a network environment according to various embodiments.

FIG. 15 is a block diagram illustrating an electronic device 1501 in a network environment 1500 according to various embodiments.

Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one (e.g., the connecting terminal 1578) of the components may be omitted from the electronic device 1501, or one or more other components may be added in the electronic device 101. According to an embodiment, some (e.g., the sensor module 1576, the camera module 1580, or the antenna module 1597) of the components may be integrated into a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 1501 includes the main processor 1521 and the auxiliary processor 1523, the auxiliary processor 1523 may be configured to use lower power than the main processor 1521 or to be specified for a designated function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 123. According to an embodiment, the auxiliary processor 1523 (e.g., the neural processing unit) may include a hardware structure specified for artificial intelligence model processing. The artificial intelligence model may be generated via machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by other component (e.g., the processor 1520) of the electronic device 1501, from the outside (e.g., a user) of the electronic device 1501. The input module 1550 may include, for example, a microphone, a mouse, a keyboard, keys (e.g., buttons), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display 1560 may include, for example, a display, a hologram device, or a projector and control circuitry to control a corresponding one of the display, hologram device, and projector. According to an embodiment, the display 1560 may include a touch sensor configured to detect a touch, or a pressure sensor configured to measure the intensity of a force generated by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 101, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or motion) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the extremal electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device 1504 via a first network 1598 (e.g., a short-range communication network, such as Bluetooth™, wireless-fidelity (Wi-Fi) direct, or infrared data association (IrDA)) or a second network 1599 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 1592 may identify or authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology. e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device). According to an embodiment, the antenna module 1597 may include one antenna including a radiator formed of a conductor or conductive pattern formed on a substrate (e.g., a printed circuit board (PCB)). According to an embodiment, the antenna module 1597 may include a plurality of antennas (e.g., an antenna array). In this case, at least one antenna appropriate for a communication scheme used in a communication network, such as the first network 1598 or the second network 1599, may be selected from the plurality of antennas by, e.g., the communication module 1590. The signal or the power may then be transmitted or received between the communication module 1590 and the external electronic device via the selected at least one antenna. According to an embodiment, other parts (e.g., radio frequency integrated circuit (RFIC)) than the radiator may be further formed as part of the antenna module 1597.

According to various embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. The external electronic devices 1502 or 1504 each may be a device of the same or a different type from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In another embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, there may be provided an electronic device (e.g., the wireless power transmitting device 101 of FIG. 1) comprising a coil (e.g., the first coil 311 of FIG. 2B); an inverter (e.g., the inverter 315 of FIG. 2B) configured to provide power to the coil (e.g., the first coil 311 of FIG. 2B); a power providing circuit (e.g., the power providing circuit 317 of FIG. 2B); a communication circuit (e.g., the first communication circuit 320 of FIG. 2B), and a control circuit (e.g., the first control circuit 330 of FIG. 2B), wherein the control circuit (e.g., the first control circuit 330 of FIG. 2B) is configured to control the power providing circuit (e.g., the power providing circuit 317 of FIG. 2B) to apply a designated first voltage to an input terminal (e.g., the input terminal 316 of FIG. 2B) of the inverter (e.g., the inverter 315 of FIG. 2B), the inverter (e.g., the inverter 315 of FIG. 2B) outputting a first magnitude of power based on the application of the first voltage, control the power providing circuit (e.g., the power providing circuit 317 of FIG. 2B) to apply a second voltage lower than the first voltage to the input terminal (e.g., the input terminal 316 of FIG. 2B) of the inverter (e.g., the inverter 315 of FIG. 2B), based on the application of the first voltage being maintained for a designated time, identify, through the communication circuit (e.g., the first communication circuit 320 of FIG. 2B), a first control error packet from the wireless power receiving device (e.g., the wireless power receiving device 195 of FIG. 1), while applying the second voltage, and identify a first value included in the first control error packet.

According to various embodiments, there may be provided the electronic device (e.g., the wireless power transmitting device 101 of FIG. 1), wherein the control circuit (e.g., the first control circuit 330 of FIG. 2B) is configured to control to increase a frequency of a signal applied to the input terminal (e.g., the input terminal 316 of FIG. 2B) of the inverter (e.g., the inverter 315 of FIG. 2B) so that power transferred to the wireless power receiving device (e.g., the wireless power receiving device 195 of FIG. 1) decreases, based on the application of the first voltage being maintained for the designated time.

According to various embodiments, there may be provided the electronic device (e.g., the wireless power transmitting device 101 of FIG. 1), wherein the control circuit (e.g., the first control circuit 330 of FIG. 2B) is configured to control the power providing circuit (e.g., the power providing circuit 317 of FIG. 2B) to apply a third voltage lower than the second voltage to the input terminal (e.g., the input terminal 316 of FIG. 2B) of the inverter (e.g., the inverter 315 of FIG. 2B) when the first value has a positive value, and identify, through the communication circuit (e.g., the first communication circuit 320 of FIG. 2B), a second control error packet from the wireless power receiving device (e.g., the wireless power receiving device 195 of FIG. 1) while applying the third voltage.

According to various embodiments, there may be provided the electronic device (e.g., the wireless power transmitting device 101 of FIG. 1), wherein the control circuit (e.g., the first control circuit 330 of FIG. 2B) is configured to identify whether the second voltage corresponds to a designated threshold voltage, control the power providing circuit (e.g., the power providing circuit 317 of FIG. 2B) to apply a third voltage lower than the second voltage to the input terminal (e.g., the input terminal 316 of FIG. 2B) of the inverter (e.g., the inverter 315 of FIG. 2B) when the second voltage does not correspond to the threshold voltage, identify, through the communication circuit (e.g., the first communication circuit 320 of FIG. 2B), a second control error packet from the wireless power receiving device (e.g., the wireless power receiving device 195 of FIG. 1) while applying the third voltage, and identify a second value included in the second control error packet.

According to various embodiments, there may be provided the electronic device (e.g., the wireless power transmitting device 101 of FIG. 1), wherein the control circuit (e.g., the first control circuit 330 of FIG. 2B) is configured to identify whether the third voltage corresponds to the threshold voltage, compares the identified second value with a designated threshold value when the third voltage corresponds to the threshold voltage, identify that the wireless power receiving device (e.g., the wireless power receiving device 195 of FIG. 1) is misaligned, when the second value is larger than the threshold value, and perform at least one control operation based on identifying the misalignment of the wireless power receiving device (e.g., the wireless power receiving device 195 of FIG. 1).

According to various embodiments, there may be provided the electronic device (e.g., the wireless power transmitting device 101 of FIG. 1), wherein the control circuit (e.g., the first control circuit 330 of FIG. 2B) is configured to compare the identified first value with a designated threshold value, control the power providing circuit (e.g., the power providing circuit 317 of FIG. 2B) to apply a third voltage lower than the second voltage to the input terminal (e.g., the input terminal 316 of FIG. 2B) of the inverter (e.g., the inverter 315 of FIG. 2B) when the identified first value is smaller than the threshold value, identify a second control error packet from the wireless power receiving device (e.g., the wireless power receiving device 195 of FIG. 1) through the communication circuit (e.g., the first communication circuit 320 of FIG. 2B), based on the application of the third voltage, and identify a second value included in the second control error packet.

According to various embodiments, there may be provided the electronic device (e.g., the wireless power transmitting device 101 of FIG. 1), wherein the control circuit (e.g., the first control circuit 330 of FIG. 2B) is configured to compare the identified second value with the threshold value, compare the third voltage with a threshold voltage when the second value is larger than the threshold value, identify that the wireless power receiving device (e.g., the wireless power receiving device 195 of FIG. 1) is misaligned, when the third voltage is less than the threshold voltage, and perform at least one control operation based on identifying the misalignment of the wireless power receiving device (e.g., the wireless power receiving device 195 of FIG. 1).

According to various embodiments, there may be provided the electronic device (e.g., the wireless power transmitting device 101 of FIG. 1), further comprising a fan, wherein the at least one control operation includes at least one of an operation of controlling the power providing circuit (e.g., the power providing circuit 317 of FIG. 2B) to apply a fourth voltage lower than the first voltage to the input terminal (e.g., the input terminal 316 of FIG. 2B) of the inverter (e.g., the inverter 315 of FIG. 2B), an operation of driving the fan, or an operation of reducing an amount of current transferred to the coil (e.g., the first coil 311 of FIG. 2B).

According to various embodiments, there may be provided the electronic device (e.g., the wireless power transmitting device 101 of FIG. 1), wherein the control circuit (e.g., the first control circuit 330 of FIG. 2B) is configured to compare the identified second voltage with the threshold value when the third voltage corresponds to a designated threshold voltage, identify that the wireless power receiving device (e.g., the wireless power receiving device 195 of FIG. 1) is aligned, when the second value is smaller than the threshold value, and control the power providing circuit (e.g., the power providing circuit 317 of FIG. 2B) to apply the designated first voltage to the input terminal (e.g., the input terminal 316 of FIG. 2B) of the inverter (e.g., the inverter 315 of FIG. 2B), based on identifying that the wireless power receiving device (e.g., the wireless power receiving device 195 of FIG. 1) is aligned.

According to various embodiments, there may be provided the electronic device (e.g., the wireless power transmitting device 101 of FIG. 1), wherein the control circuit (e.g., the first control circuit 330 of FIG. 2B) is configured to control the power providing circuit (e.g., the power providing circuit 317 of FIG. 2B) to apply the second voltage lower than the first voltage to the input terminal (e.g., the input terminal 316 of FIG. 2B) of the inverter (e.g., the inverter 315 of FIG. 2B) when a control error packet is not received from the wireless power receiving device (e.g., the wireless power receiving device 195 of FIG. 1) based on the application of the first voltage being maintained for the designated time.

According to various embodiments, there may be provided the electronic device (e.g., the wireless power transmitting device 101 of FIG. 1), wherein the control circuit (e.g., the first control circuit 330 of FIG. 2B) is configured to identify an occurrence of an event configured to identify an alignment state of the wireless power receiving device (e.g., the wireless power receiving device 195 of FIG. 1) while applying the first voltage and control the power providing circuit (e.g., the power providing circuit 317 of FIG. 2B) to apply the second voltage lower than the first voltage to the input terminal (e.g., the input terminal 316 of FIG. 2B) of the inverter (e.g., the inverter 315 of FIG. 2B) when the control error packet is not received from the wireless power receiving device (e.g., the wireless power receiving device 195 of FIG. 1) based on the occurrence of the event.

According to various embodiments, there may be provided the electronic device (e.g., the wireless power transmitting device 101 of FIG. 1), wherein the control circuit (e.g., the first control circuit 330 of FIG. 2B) is configured to obtain information associated with the wireless power receiving device (e.g., the wireless power receiving device 195 of FIG. 1) and compare the first value with a threshold value corresponding to the information associated with the wireless power receiving device (e.g., the wireless power receiving device 195 of FIG. 1).

According to various embodiments, there may be provided a method for operating an electronic device (e.g., the wireless power transmitting device 101 of FIG. 1), comprising controlling a power providing circuit (e.g., the power providing circuit 317 of FIG. 2B) of the electronic device (e.g., the wireless power transmitting device 101 of FIG. 1) to apply a designated first voltage to an input terminal (e.g., the input terminal 316 of FIG. 2B) of an inverter (e.g., the inverter 315 of FIG. 2B) of the electronic device (e.g., the wireless power transmitting device 101 of FIG. 1), the inverter (e.g., the inverter 315 of FIG. 2B) outputting a first magnitude of power based on the application of the first voltage; controlling the power providing circuit (e.g., the power providing circuit 317 of FIG. 2B) to apply a second voltage lower than the first voltage to the input terminal (e.g., the input terminal 316 of FIG. 2B) of the inverter (e.g., the inverter 315 of FIG. 2B), based on the application of the first voltage being maintained for a designated time; identifying, through a communication circuit (e.g., the first communication circuit 320 of FIG. 2B) of the electronic device (e.g., the wireless power transmitting device 101 of FIG. 1), a first control error packet from a wireless power receiving device (e.g., the wireless power receiving device 195 of FIG. 1), while applying the second voltage; and identifying a first value included in the first control error packet.

According to various embodiments, there may be provided the method further comprising controlling to increase a frequency of a signal applied to the input terminal (e.g., the input terminal 316 of FIG. 2B) of the inverter (e.g., the inverter 315 of FIG. 2B) so that power transferred to the wireless power receiving device (e.g., the wireless power receiving device 195 of FIG. 1) decreases, based on the application of the first voltage being maintained for the designated time.

According to various embodiments, there may be provided the method further comprising controlling the power providing circuit (e.g., the power providing circuit 317 of FIG. 2B) to apply a third voltage lower than the second voltage to the input terminal (e.g., the input terminal 316 of FIG. 2B) of the inverter (e.g., the inverter 315 of FIG. 2B) when the first value has a positive value; and identifying, through the communication circuit (e.g., the first communication circuit 320 of FIG. 2B), a second control error packet from the wireless power receiving device (e.g., the wireless power receiving device 195 of FIG. 1) while applying the third voltage.

According to various embodiments, there may be provided the method further comprising identifying whether the second voltage corresponds to a designated threshold voltage; controlling the power providing circuit to apply a third voltage lower than the second voltage to the input terminal (e.g., the input terminal 316 of FIG. 2B) of the inverter (e.g., the inverter 315 of FIG. 2B) when the second voltage does not correspond to the threshold voltage; identifying, through the communication circuit, a second control error packet from the wireless power receiving device (e.g., the wireless power receiving device 195 of FIG. 1) while applying the third voltage; and identifying a second value included in the second control error packet.

According to various embodiments, there may be provided the method further comprising identifying whether the third voltage corresponds to the threshold voltage; comparing the identified second value with the designated threshold value when the third voltage corresponds to the threshold voltage; identifying that the wireless power receiving device is misaligned, when the second value is larger than the threshold value; and performing at least one control operation based on identifying that the wireless power receiving device is misaligned.

According to various embodiments, there may be provided the method further comprising comparing the identified first value with a designated threshold value, controlling the power providing circuit (e.g., the power providing circuit 317 of FIG. 2B) to apply a third voltage lower than the second voltage to the input terminal (e.g., the input terminal 316 of FIG. 2B) of the inverter (e.g., the inverter 315 of FIG. 2B) when the identified first value is smaller than the threshold value; identifying a second control error packet from the wireless power receiving device (e.g., the wireless power receiving device 195 of FIG. 1) through the communication circuit (e.g., the first communication circuit 320 of FIG. 2B), based on the application of the third voltage; and identifying a second value included in the second control error packet.

According to various embodiments, there may be provided the method further comprising comparing the identified second value with the threshold value; comparing the third voltage with a threshold voltage when the second value is larger than the threshold value; identifying that the wireless power receiving device (e.g., the wireless power receiving device 195 of FIG. 1) is misaligned, when the third voltage is less than the threshold voltage; and performing at least one control operation based on identifying the misalignment of the wireless power receiving device (e.g., the wireless power receiving device 195 of FIG. 1).

According to various embodiments, there may be provided an electronic device (e.g., the wireless power transmitting device 101 of FIG. 1) comprising a coil (e.g., the first coil 311 of FIG. 2B); an inverter (e.g., the inverter 315 of FIG. 2B) configured to provide power to the coil (e.g., the first coil 311 of FIG. 2B); a power providing circuit (e.g., the power providing circuit 317 of FIG. 2B); a communication circuit (e.g., the first communication circuit 320 of FIG. 2B), and a control circuit (e.g., the first control circuit 330 of FIG. 2B), wherein the control circuit (e.g., the first control circuit 330 of FIG. 2B) is configured to control the power providing circuit (e.g., the power providing circuit 317 of FIG. 2B) to apply a designated first voltage to an input terminal (e.g., the input terminal 316 of FIG. 2B) of the inverter (e.g., the inverter 315 of FIG. 2B), the inverter (e.g., the inverter 315 of FIG. 2B) outputting a first magnitude of power based on the application of the first voltage, control the power providing circuit (e.g., the power providing circuit 317 of FIG. 2B) to apply a second voltage lower than the first voltage to the input terminal (e.g., the input terminal 316 of FIG. 2B) of the inverter (e.g., the inverter 315 of FIG. 2B), based on the application of the first voltage being maintained for a designated time, identify, through the communication circuit (e.g., the first communication circuit 320 of FIG. 2B), a first control error packet received from the wireless power receiving device (e.g., the wireless power receiving device 195 of FIG. 1), while applying the second voltage, identify a first value, which is a positive value, included in the first control error packet, compare the first value with a designated threshold value, identify that the wireless power receiving device (e.g., the wireless power receiving device 195 of FIG. 1) is misaligned when the first value is larger than the threshold value, and control the power providing circuit (e.g., the power providing circuit 317 of FIG. 2B) to apply a third voltage lower than the second voltage to the input terminal (e.g., the input terminal 316 of FIG. 2B) of the inverter (e.g., the inverter 315 of FIG. 2B) when the first value is smaller than the threshold value.

While the disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device, comprising:
   a coil;
   an inverter configured to provide power to the coil;
   a power providing circuit;
   a communication circuit, and
   a control circuit, wherein the control circuit is configured to:
      control the power providing circuit to apply a first voltage of driving voltages to an input terminal of the inverter, the inverter outputting a first magnitude of power based on the application of the first voltage,
      control the power providing circuit to apply a second voltage of the driving voltages lower than the first voltage to the input terminal of the inverter, based on the application of the first voltage being maintained for a specific time,
      identify, through the communication circuit, a first control error packet from a wireless power receiving device, while applying the second voltage,
      identify a first value included in the first control error packet,
      based on the identified first value being less than a threshold value, identify whether the second voltage corresponds to a threshold voltage,
      control the power providing circuit to apply a third voltage lower than the second voltage to the input terminal of the inverter when the second voltage does not correspond to the threshold voltage,
      identify, through the communication circuit, a second control error packet from a wireless power receiving device, while applying the third voltage,
      identify a second value included in the second control error packet,
      based on the second value being greater than the threshold value, identify that the wireless power receiving device is misaligned with the electronic device, and
      perform at least one control operation based on identifying the misalignment of the wireless power receiving device,
   wherein the driving voltages are decreased step-wise in response to a step-wise increase in control error packet values below the threshold.

2. The electronic device of claim 1,
   wherein the control circuit is further configured to control to increase a frequency of a signal applied to the input terminal of the inverter so that power transferred to the wireless power receiving device decreases, based on the application of the first voltage being maintained for the specific time.

3. The electronic device of claim 1, further comprising a fan,
   wherein the at least one control operation includes at least one of an operation of controlling the power providing circuit to apply a fourth voltage lower than the first voltage to the input terminal of the inverter, an operation of driving the fan, or an operation of reducing an amount of current transferred to the coil.

4. The electronic device of claim 3,
   wherein the control circuit is further configured to:
      compare the identified second voltage with the threshold value when the third voltage corresponds to a threshold voltage, identify that the wireless power receiving device is aligned with the electronic device, when the second value is less than the threshold value, and control the power providing circuit to apply the first voltage to the input terminal of the inverter, based on identifying that the wireless power receiving device is aligned.

5. The electronic device of claim 1, wherein the control circuit is further configured to control the power providing circuit to apply the second voltage lower than the first voltage to the input terminal of the inverter when a control error packet is not received from the wireless power receiving device based on the application of the first voltage being maintained for the specific time.

6. The electronic device of claim 5, wherein the control circuit is further configured to:
identify an occurrence of an event configured to identify an alignment state of the wireless power receiving device while applying the first voltage, and
control the power providing circuit to apply the second voltage lower than the first voltage to the input terminal of the inverter when the control error packet is not received from the wireless power receiving device based on the occurrence of the event.

7. The electronic device of claim 1, wherein the control circuit is further configured to:
obtain information associated with the wireless power receiving device, and
compare the first value with a threshold value corresponding to the information associated with the wireless power receiving device.

8. A method for operating an electronic device, the method comprising:

controlling a power providing circuit of the electronic device to apply a first voltage of driving voltages to an input terminal of an inverter of the electronic device, the inverter outputting a first magnitude of power based on the application of the first voltage;

controlling the power providing circuit to apply a second voltage of the driving voltages lower than the first voltage to the input terminal of the inverter, based on the application of the first voltage being maintained for a specific time;

identifying, through a communication circuit of the electronic device, a first control error packet from a wireless power receiving device, while applying the second voltage;

identifying a first value included in the first control error packet;

based on the identified first value being less than a threshold value, identifying whether the second voltage corresponds to a threshold voltage;

controlling the power providing circuit to apply a third voltage lower than the second voltage to the input terminal of the inverter when the second voltage does not correspond to the threshold voltage;

identifying, through the communication circuit, a second control error packet from a wireless power receiving device, while applying the third voltage;

identifying a second value included in the second control error packet;

based on the second value being greater than the threshold value, identifying that the wireless power receiving device is misaligned with the electronic device; and performing at least one control operation based on identifying the misalignment of the wireless power receiving device, wherein the driving voltages are decreased step-wise in response to a step-wise increase in control error packet values below the threshold.

9. The method of claim 8, further comprising controlling to increase a frequency of a signal applied to the input terminal of the inverter so that power transferred to the wireless power receiving device decreases, based on the application of the first voltage being maintained for the specific time.

* * * * *